(12) United States Patent  
Tsukuda et al.

(10) Patent No.: US 9,147,870 B2  
(45) Date of Patent: Sep. 29, 2015

(54) RECHARGEABLE BATTERY

(75) Inventors: Yoshihiro Tsukuda, Osaka (JP); Kazuo Yamada, Osaka (JP); Kazuya Sakashita, Osaka (JP); Yuki Watanabe, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 520 days.

(21) Appl. No.: 13/401,162

(22) Filed: Feb. 21, 2012

(65) Prior Publication Data

US 2012/0214051 A1  Aug. 23, 2012

(30) Foreign Application Priority Data

Feb. 21, 2011  (JP) ................. 2011-034464

(51) Int. Cl.
| | |
|---|---|
| *H01M 2/04* | (2006.01) |
| *H01M 2/30* | (2006.01) |
| *H01M 2/02* | (2006.01) |
| *H01M 2/06* | (2006.01) |
| *H01M 2/08* | (2006.01) |
| *H01M 10/04* | (2006.01) |
| *H01M 10/052* | (2010.01) |
| *H01M 10/0585* | (2010.01) |

(52) U.S. Cl.
CPC .............. *H01M 2/30* (2013.01); *H01M 2/0257* (2013.01); *H01M 2/0408* (2013.01); *H01M 2/0478* (2013.01); *H01M 2/06* (2013.01); *H01M 2/08* (2013.01); *H01M 10/0413* (2013.01); *H01M 10/052* (2013.01); *H01M 10/0585* (2013.01); *Y02E 60/122* (2013.01)

(58) Field of Classification Search
CPC ....................................................... H01M 2/04
USPC ............................................................ 429/179
See application file for complete search history.

(56) References Cited

U.S. PATENT DOCUMENTS

| | | | |
|---|---|---|---|
| 2003/0118900 A1 | 6/2003 | Otohata | |
| 2006/0121344 A1 | 6/2006 | Amagai et al. | |
| 2007/0269685 A1* | 11/2007 | Chu et al. | 429/3 |
| 2009/0142660 A1* | 6/2009 | Hori et al. | 429/174 |
| 2009/0197182 A1* | 8/2009 | Katoh | 429/305 |
| 2010/0021811 A1 | 1/2010 | Kado et al. | |

FOREIGN PATENT DOCUMENTS

| | | |
|---|---|---|
| CN | 1430294 A | 7/2003 |
| CN | 1767227 A | 5/2006 |
| CN | 101635366 A | 1/2010 |
| JP | 2000-331656 | 11/2000 |

* cited by examiner

*Primary Examiner* — Ula Ruddock  
*Assistant Examiner* — Jacob Marks  
(74) *Attorney, Agent, or Firm* — Nixon & Vanderhye P.C.

(57) ABSTRACT

A rechargeable battery having excellent heat resistance, pressure resistance, and airtightness is provided by using a crimping technique to connect a metal exterior body and an electrode terminal. The rechargeable battery comprises an electrode group which includes a positive electrode and a negative electrode; an exterior container which includes an exterior canister for housing the electrode group, and a sealing plate for sealing an open part of the exterior canister; a pair of electrode terminals crimp-joined to the exterior container from inside the exterior container; and an electrolyte solution filled into the exterior container.

13 Claims, 17 Drawing Sheets

RECHARGEABLE BATTERY

This application is based on Japanese Patent Application No. 2011-034464 filed on Feb. 21, 2011, the contents of which are hereby incorporated by reference.

BACKGROUND OF THE INVENTION

1. Field of the Invention

The present invention relates to a rechargeable battery.

2. Description of Related Art

Rapid reductions in size and weight and addition of multifunction capabilities in consumer mobile telephones, portable electronic devices, mobile information terminals, and the like in recent years have created a need for rechargeable batteries as power sources which satisfy conditions of small size and weight, high energy density, ability to be recharged repeatedly for a long time, and other conditions. Lithium-ion rechargeable batteries, which have high energy density compared to other rechargeable batteries, are the most promising type of rechargeable battery for meeting the needs described above. Various research is under way to develop a superior lithium-ion rechargeable battery.

In order to address global warming and other environmental problems, lithium-ion rechargeable batteries have come to be used in power storage systems that are used in solar power generation systems, wind power generation systems, and the like. As a measure for reducing $CO_2$ and overcoming energy problems, the use of hybrid automobiles (HEV: Hybrid Electric Vehicle) and electric automobiles (EV: Electric Vehicle) having low fuel consumption and low gas emissions is expected to increase, and lithium-ion rechargeable batteries targeted for use as automotive batteries are being developed and brought to market.

Demand for lithium-ion rechargeable batteries is thus increasing not only for mobile devices but for large-scale motive power applications as well. When a lithium-ion rechargeable battery is used in a motive power or electrical power storage system, the battery must be endowed with large capacity to enable discharge over long periods of time, and there is also a need for increased service life.

Lithium-ion rechargeable batteries of various shapes and sizes have been proposed for adaption to these applications. A lithium-ion rechargeable battery is generally formed by arranging a positive electrode having a positive electrode active material layer formed therein and a negative electrode having a negative electrode active material layer formed therein so as to face each other with a separator therebetween, housing the electrode group thus formed in an exterior body (housing container), and then injecting a non-aqueous electrolyte therein. Charging and discharging then occurs by the movement of lithium ions between the positive electrode and the negative electrode.

Known shape types for the electrode group include a coil type in which the electrode group is integrally coiled, and a stacked type in which the positive electrode, the separator, and the negative electrode are stacked in a planar shape. A coiled electrode group is housed in a cylindrical canister (exterior body) to form a cylindrical rechargeable battery (see Japanese Laid-open Patent Publication No. 2000-331656). A stacked electrode group may be covered by a laminate film (exterior body) to form a laminate-type rechargeable battery, or the stacked electrode group may be housed in a prismatic canister to form a prismatic battery.

Such a lithium-ion rechargeable battery generates heat and expands during charging and discharging, and therefore must be heat resistant and pressure resistant. Since an electrolyte solution is also sealed therein, airtightness is required. In the cylindrical rechargeable battery described above, resin is used in a portion of a lid that forms part of the exterior body. The center part of the lid forms the positive electrode terminal and is therefore made of metal, but the periphery thereof insulates from the exterior canister and is therefore formed using a resin gasket. The resin gasket is also subjected to heat and pressure. Resin is more susceptible to heat and pressure than metal and is prone to degrade, and the use thereof therefore leads to reduced durability of the rechargeable battery.

In the laminate rechargeable battery described above, since resin surfaces of laminate films are heat-fused to each other, the resin is made hard and brittle by the heat during fusion, and cannot be considered to have high durability.

In the prismatic battery described above, electrode terminals are laser-welded in through holes in a metal exterior body. Since dissimilar materials are difficult to weld together by laser welding, the materials of the exterior body and the electrode terminals are limited. Furthermore, in materials that include resin, the resin near the weld is melted by laser welding, and a high-strength laminated steel sheet cannot be used as the material for the exterior body.

SUMMARY OF THE INVENTION

An object of the present invention is to provide a rechargeable battery having excellent heat resistance, pressure resistance, and airtightness by using a crimping technique to connect a metal exterior body and an electrode terminal.

The rechargeable battery of the present invention for achieving the abovementioned objects comprises an electrode group including a positive electrode and a negative electrode; an exterior container including a housing container for housing the electrode group; and a sealing body for sealing an open part of the housing container; a pair of electrode terminals crimp-joined to the exterior container from inside the exterior container; and an electrolyte solution filled into the exterior container.

Through this configuration, since a crimping technique is used to join the exterior container and the electrode terminals, there is no need for heat welding or laser welding.

Preferably, in the rechargeable battery described above, the pair of electrode terminals is provided to the housing container of the exterior container.

Preferably, in the rechargeable battery described above, one each of the pair of electrode terminals is provided to opposing side wall parts of the housing container.

In the rechargeable battery described above, the pair of electrode terminals may be provided to the same side wall part of the housing container.

In the rechargeable battery described above, the pair of electrode terminals may be provided to the sealing body of the exterior container.

In the rechargeable battery described above, a configuration may be adopted in which at least one of the pair of electrode terminals has a metal base part having a through-hole; a metal terminal part passed through the through-hole; and an insulation part for insulating the terminal part and the base part; and the base part is crimp-joined to the exterior container.

In the rechargeable battery described above, a configuration may be adopted in which at least one of the pair of electrode terminals has a metal base part, and a metal terminal part integrally molded so as to protrude at a front and back of the base part; and the base part is crimp joined to the exterior container.

In the rechargeable battery described above, a configuration may be adopted in which the housing container comprises a double-sided laminate material formed by laminating both sides of a metal sheet with an insulative resin; and the pair of electrode terminals has a metal base part, and a metal terminal part integrally molded so as to protrude at a front and back of the base part, and the base part is crimp joined to the exterior container.

In the rechargeable battery described above, a configuration may be adopted in which the housing container comprises a single-sided laminate material formed by laminating one side of a metal sheet with an insulative resin; one of the electrode terminals has a metal first base part having a through-hole, a metal first terminal part passed through the through-hole, and an insulation part for insulating the first terminal part and the first base part, and the first base part is crimp-joined; and the other of the electrode terminals has a metal second base part, and a metal second terminal part integrally molded so as to protrude at a front and back of the second base part, and the second base part is crimp joined to the exterior container.

In the rechargeable battery described above, the thickness of the metal sheet is preferably 0.5 mm to 2 mm.

In the rechargeable battery described above, a configuration may be adopted in which the housing container comprises a metal sheet; and the pair of electrode terminals has a metal base part having a through-hole; a metal terminal part passed through the through-hole; and an insulation part for insulating the terminal part and the base part; and the base part is crimp joined to the exterior container.

In the rechargeable battery described above, the crimp is preferably a folded crimp.

In the rechargeable battery described above, the overlap during formation of the folded crimp is preferably 50% or greater.

In the rechargeable battery described above, the housing container and the sealing body are preferably double-seam sealed.

In the rechargeable battery described above, the overlap during the double-seam sealing is preferably 70% or greater.

Through the present invention, by crimp-joining the electrode terminals, a rechargeable battery having excellent heat resistance, pressure resistance, and airtightness can be provided. Since the electrode terminals are crimp-joined from inside the battery, in a case in which the internal pressure of the battery increases, force acts on the crimp-joined portion in the direction of strengthening the joint and contributes to enhancing pressure resistance and airtightness. Joining of dissimilar materials, which is difficult by laser welding, can also be easily accomplished by crimp joining. Crimp joining also has the advantage of high production speed.

DETAILED DESCRIPTION OF PREFERRED EMBODIMENTS

In the embodiments described below, a case is described in which the present invention is applied to a stacked lithium-ion rechargeable battery as an example of a rechargeable battery. In the present invention, "crimping" or "crimp joining" refers to a joint in which two members are pressure welded together so as to be enfolded in each other, such as by folded crimping.

First Embodiment

Figure 1:
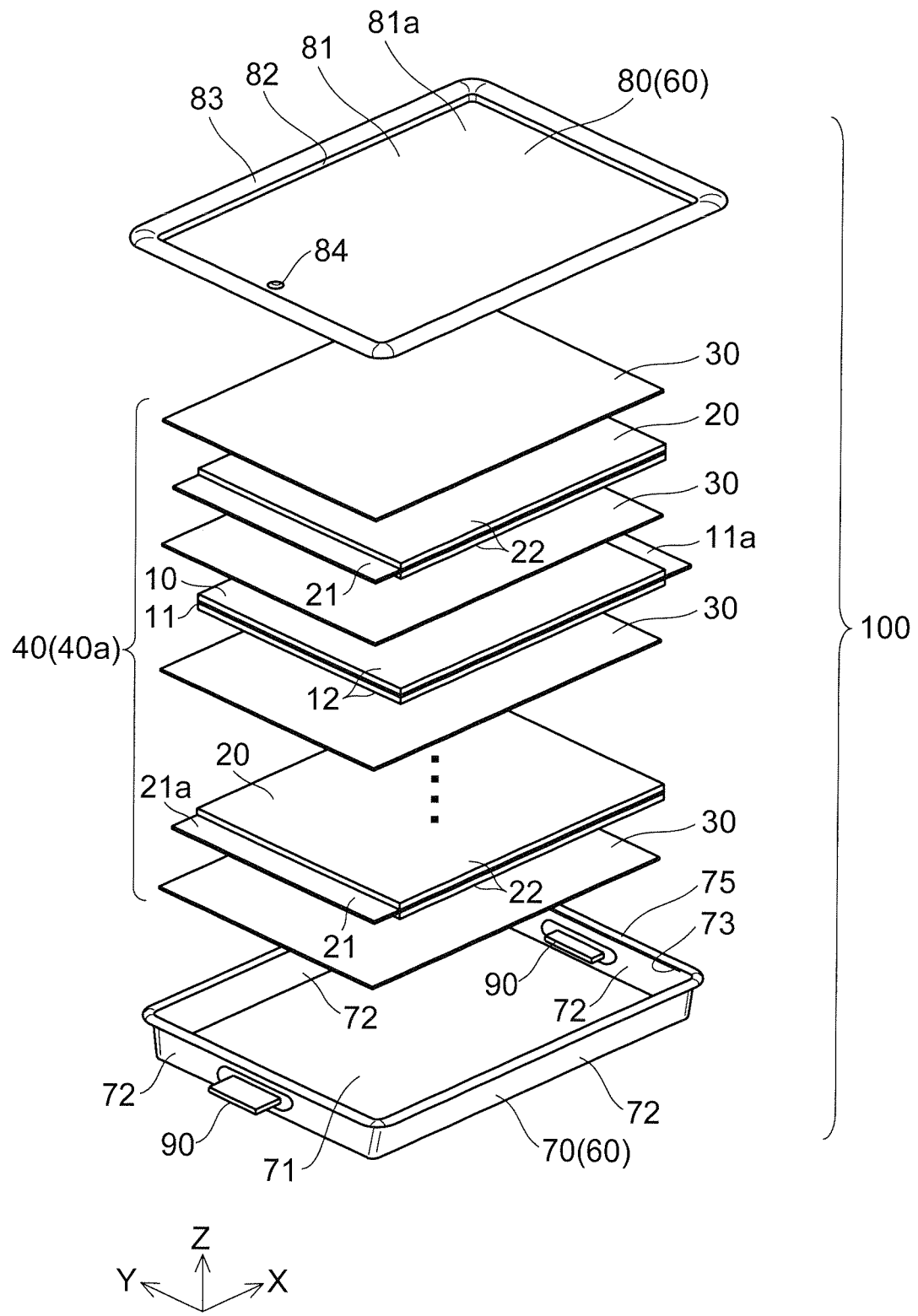
FIG. 1 is an exploded perspective view showing the lithium-ion rechargeable battery according to a first embodiment of the present invention.
Figure 2:
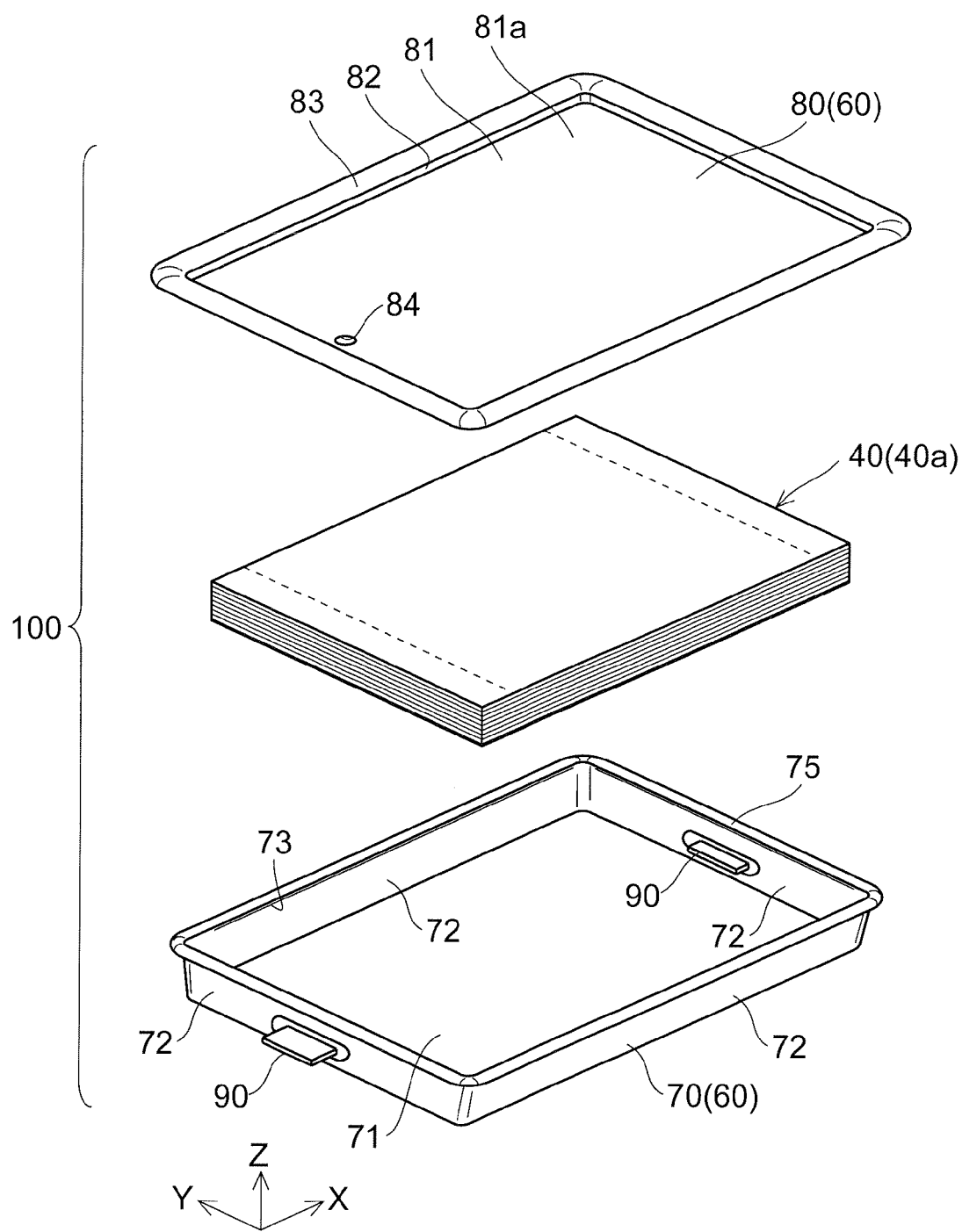
FIG. 2 is an exploded perspective view showing the lithium-ion rechargeable battery according to the first embodiment of the present invention.
Figure 3:
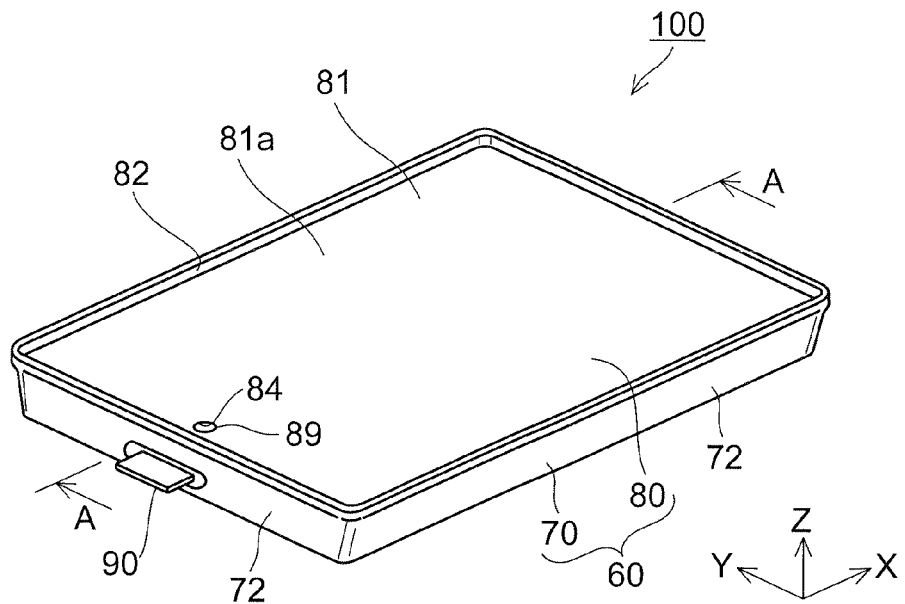
FIG. 3 is overall perspective view showing the lithium-ion rechargeable battery according to the first embodiment of the present invention.
Figure 4:
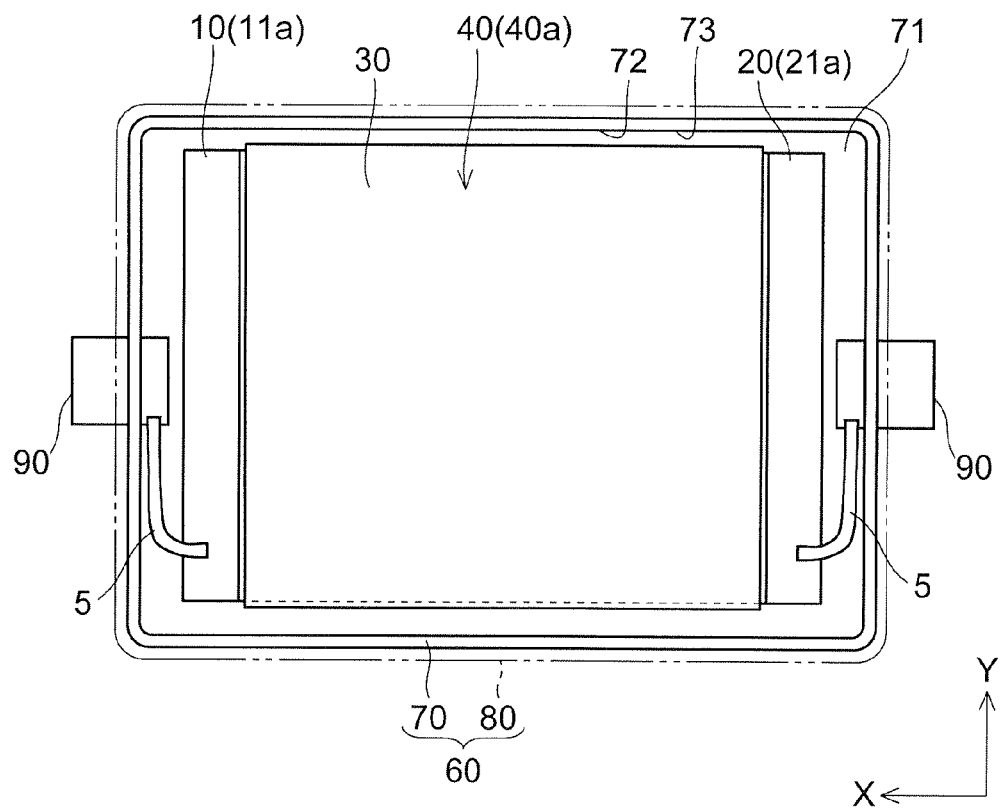
FIG. 4 is a top view showing the lithium-ion rechargeable battery according to the first embodiment of the present invention.

FIGS. 1 and 2 are exploded perspective views showing the lithium-ion rechargeable battery according to a first embodiment of the present invention. FIG. 3 is overall perspective view showing the lithium-ion rechargeable battery according to the first embodiment of the present invention. FIG. 4 is a top view showing the lithium-ion rechargeable battery according to the first embodiment of the present invention. FIGS. 5 through 15B are views showing the lithium-ion rechargeable battery according to the first embodiment of the present invention. In FIG. 4, a state is shown in which the sealing plate 80 originally provided is removed so that the inside of the lithium-ion rechargeable battery can be understood.

As shown in FIGS. 1 through 4, the lithium-ion rechargeable battery 100 of the first embodiment has a rectangular flat shape (see FIG. 3), and is provided with an electrode group 40 (see FIGS. 1 and 2) including positive electrodes 10 (see FIG. 1) and negative electrodes 20 (see FIG. 1), and an exterior container 60 for sealing the electrode group 40 in with a non-aqueous electrolyte solution. The positive electrodes 10 and the negative electrodes 20 are each examples of "electrodes" of the present invention.

Figure 5:
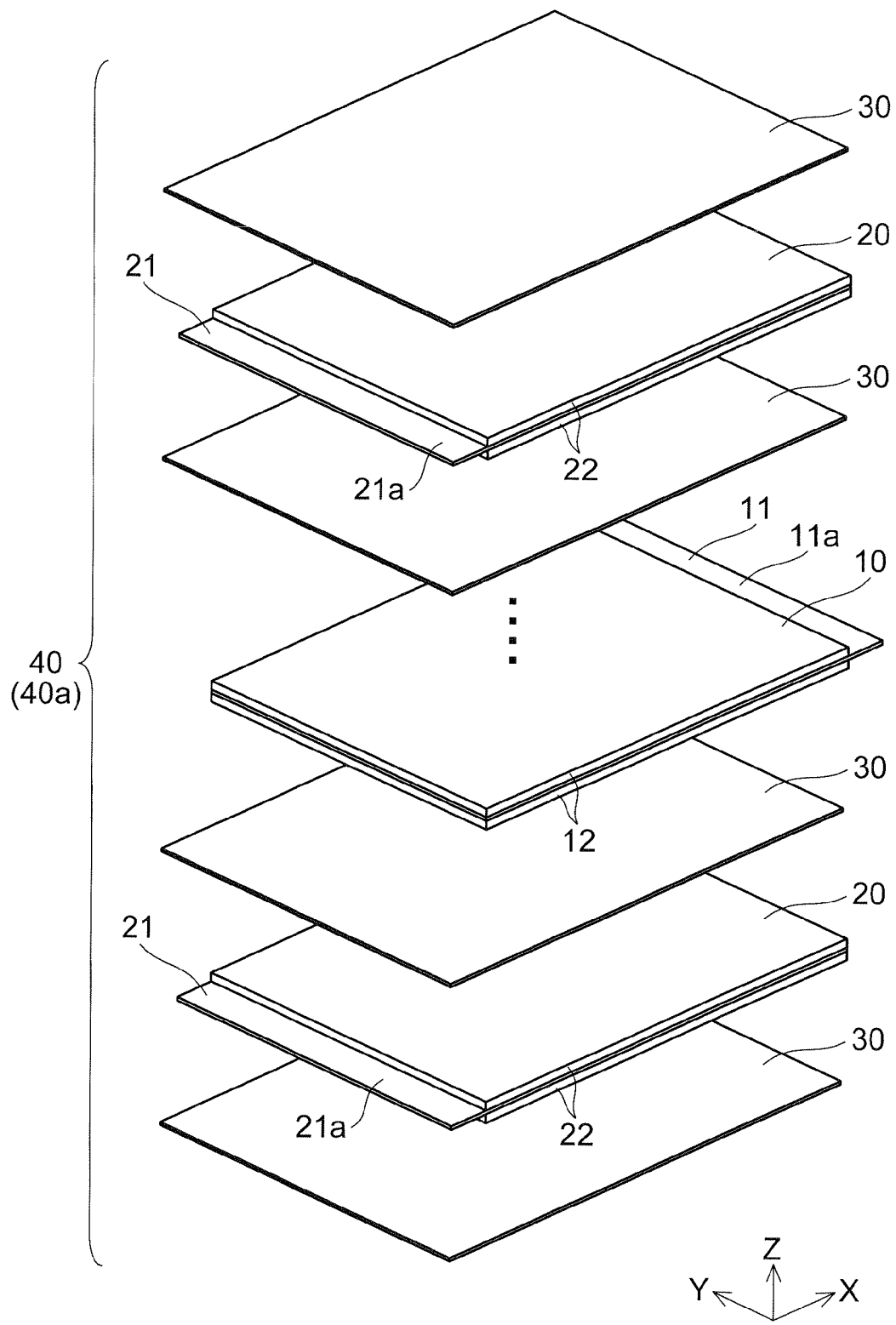
FIG. 5 is a perspective view showing the configuration of the electrode group of the lithium-ion rechargeable battery according to the first embodiment of the present invention.
Figure 6:
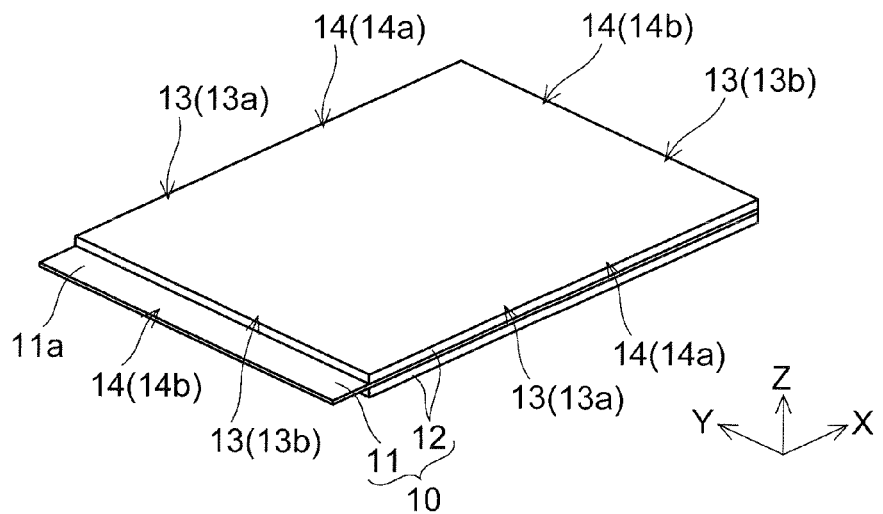
FIG. 6 is a perspective view showing the configuration of the positive electrode of the lithium-ion rechargeable battery according to the first embodiment of the present invention.

As shown in FIGS. 1 and 5, the electrode group 40 further includes separators 30 for preventing short-circuiting of the positive electrodes 10 and the negative electrodes 20. The positive electrodes 10 and the negative electrodes 20 are also each arranged facing each other with a separator 30 therebetween. Each electrode group 40 is provided with a plurality of positive electrodes 10 and negative electrodes 20, and a stacked structure (stack 40a) is formed by stacking positive electrodes 10, separators 30, and negative electrodes 20 in order. The positive electrodes 10 and negative electrodes 20 are stacked one at a time in alternating fashion. The electrode group 40 described above is configured so that one positive electrode 10 is positioned between two adjacent negative electrodes 20. Separators 30 are also placed on the outermost sides of the electrode group 40.

The electrode group 40 described above comprises 24 positive electrodes 10, 25 negative electrodes 20, and 50 separators 30, for example, and the positive electrodes 10 and negative electrodes 20 are stacked in alternating fashion with separators 30 therebetween.

The positive electrodes 10 constituting the electrode group 40 have a configuration in which positive electrode active material layers 12 are supported on both sides of a positive electrode collector 11.

The positive electrode collector 11 has the function of current collection for the positive electrode active material layers 12. The positive electrode collector 11 is composed of a metal foil of aluminum, titanium, or the like, or of an alloy foil composed of an alloy of the abovementioned metals, and has a thickness of approximately 1 μm to 500 μm (e.g., approximately 20 μm). The positive electrode collector 11 is preferably an aluminum foil, and the thickness thereof is preferably 20 μm or less.

The positive electrode collector 11 used may also be one that is treated with aluminum, titanium, or the like for the purpose of enhancing conductivity and resistance to oxidation, for example. A collector in which two or more metal foils are bonded together may also be used. A collector formed by coating a metal with resin may also be used. Besides a foil, the positive electrode collector 11 may also be a film, a sheet, a net, or a punched or expanded product, or may be in the shape of a lath, a porous body, a foam, a group of fibers, or the like.

The positive electrode active material layers 12 include a positive electrode active material capable of occluding and releasing lithium ions. Examples of positive electrode active materials include oxides containing lithium. Specific examples include $LiCoO_2$, $LiFeO_2$, $LiMnO_2$, $LiMn_2O_4$, compounds in which the transition metal in these oxides is partially substituted with another metal element, and the like. Among these examples, a positive electrode active material is preferred that is capable of utilizing 80% or more of the lithium content of the positive electrode for the battery reaction in normal use.

Examples of such a positive electrode active material include compounds having a spinel structure such as $LiMn_2O_4$, and compounds having an olivine structure such as $LiMPO_4$ (where M is one or more elements selected from the group consisting of Co, Mi, Mn, and Fe). Among these, a positive electrode active material including at least one of Mn and Fe is preferred from a cost standpoint. The use of $LiFePO_4$ is also preferred from the standpoint of safety and charging voltage. In $LiFePO_4$, since all of the oxygen (O) is bonded to phosphorus (P) by strong covalent bonding, oxygen is not readily released by increases in temperature. This material therefore has excellent safety.

The thickness of the positive electrode active material layers 12 is preferably about 20 μm to 2 mm, and more preferably about 50 μm to 1 mm.

The configuration of the positive electrode active material layers 12 is not particularly limited insofar as a positive electrode active material is included therein. For example, the positive electrode active material layers 12 may include materials other than the positive electrode active material, such as conductive materials, thickeners, binders, and the like.

An electron-conductive material that does not adversely affect the battery performance of the positive electrodes 10 may be used as a conductive material, and examples thereof include carbon black, acetylene black, Ketjen Black, graphite (natural graphite, artificial graphite), carbon fibers, and other carbon materials or conductive metal oxides. Among these examples, carbon black and acetylene black are preferred as conductive materials from the standpoint of electron conductive properties and coating properties.

Examples of thickeners that can be used include polyethylene glycols, celluloses, polyacrylamides, poly N-vinylamides, poly N-vinylpyrrolidones, and the like. Among these examples, polyethylene glycols and carboxymethylcellulose (CMC), and other celluloses are preferred, and CMC is particularly preferred as a thickener.

The binder serves to tether active material particles and conductive material particles, and examples of binders that can be used include polyvinylidene fluoride (PVdF), polyvinyl pyridine, polytetrafluoroethylene, and other fluorine-based polymers; polyethylene, polypropylene, and other polyolefin-based polymers; styrene butadiene rubber, and the like.

Examples of solvents that can be used to disperse the positive electrode active material, the conductive material, the binder, and other materials include N-methyl-2-pyrrolidone, dimethylformamide, dimethylacetamide, methyl ethyl ketone, cyclohexanone, methyl acetate, methyl acrylate, diethyl triamine, N,N-dimethylaminopropylamine, ethylene oxide, tetrahydrofuran, and other organic solvents, and water.

The positive electrode 10 described above is formed by, for example, mixing the positive electrode active material, a conductive material, a thickener, and a binder, adding an appropriate solvent to form a positive electrode mixture in paste form, applying the paste to the surface of the positive electrode collector 11 and drying the paste, and applying compression as needed to increase the electrode density.

Figure 7:
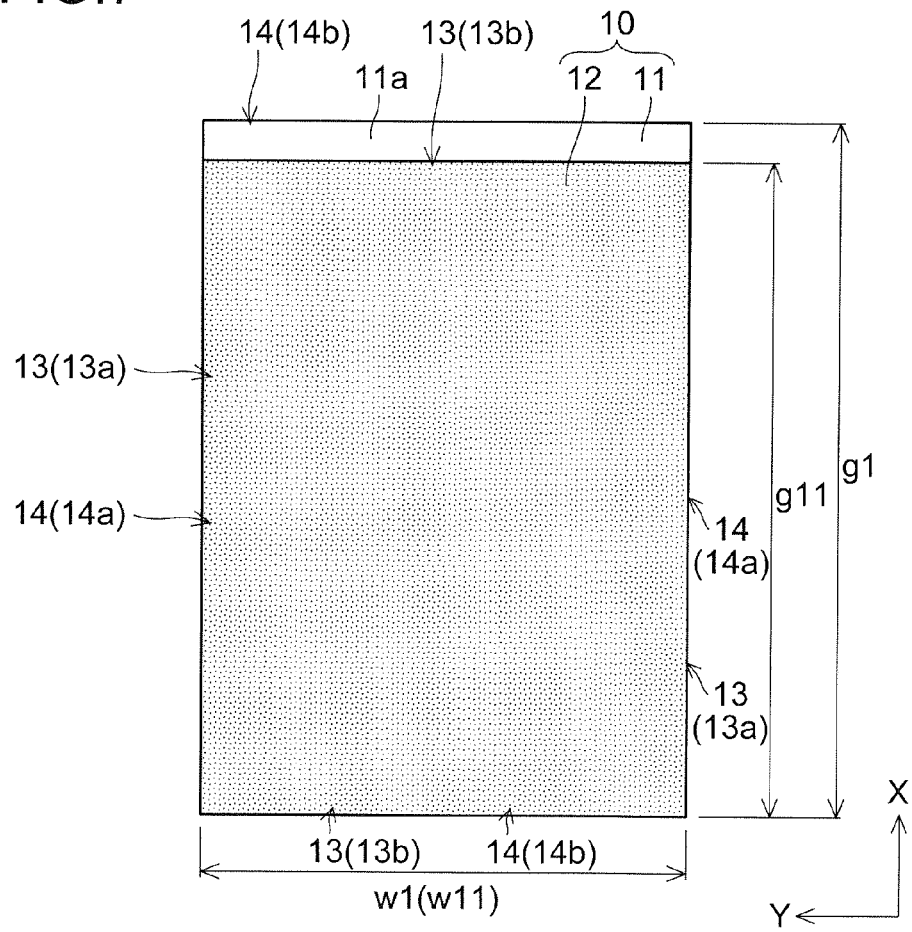
FIG. 7 is a top view showing the configuration of the positive electrode of the lithium-ion rechargeable battery according to the first embodiment of the present invention.

As shown in FIG. 7, the positive electrode 10 described above has a rectangular shape in plan view, and has four edges 14 (two edges 14a in the X direction and two edges 14b in the Y direction). In the first embodiment, the width w1 in the Y direction is approximately 150 mm, for example, and the length g1 in the X direction is approximately 320 mm, for example. The width w11 in the Y direction of the application region (formation region) of the positive electrode active material layers 12 is the same as the width w1 of the positive electrode 10, and is approximately 150 mm, for example, and the length g11 in the X direction is approximately 300 mm, for example. The positive electrode active material layers 12 formed in the application region therefore have a rectangular shape in plan view, and have four edges 13 (two edges 13a in the X direction and two edges 13b in the Y direction).

The positive electrode 10 has a collector exposure part 11a at one end thereof in the X direction in which the positive electrode active material layers 12 are not formed and the surface of the positive electrode collector 11 is exposed. A collector lead 5 (see FIG. 4) described hereinafter for extracting current to the outside is electrically connected to the collector exposure part 11a. The four edges 13 of the positive electrode active material layers 12 except for the Y-direction edge 13b on one side (the edge 13b on the side of the collector exposure part 11a) are aligned with the edges 14 of the positive electrode 10.

Figure 8:
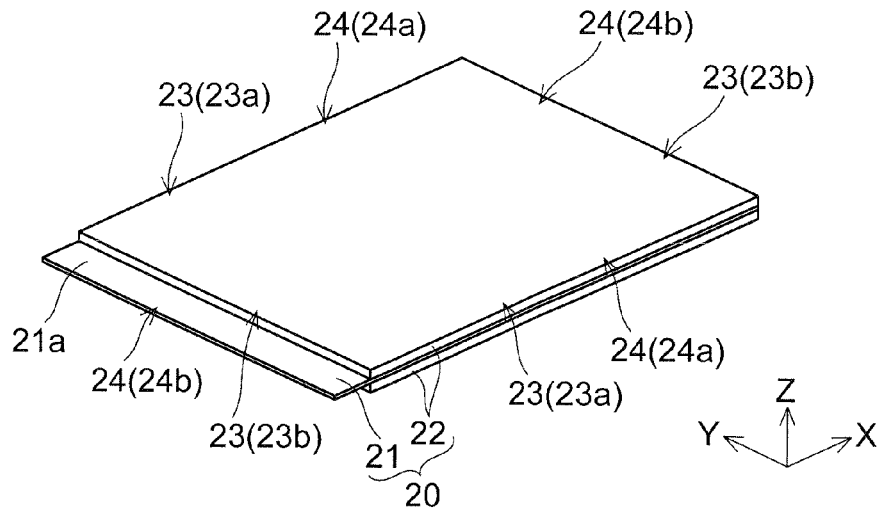
FIG. 8 is a perspective view showing the configuration of the negative electrode of the lithium-ion rechargeable battery according to the first embodiment of the present invention.
Figure 9:
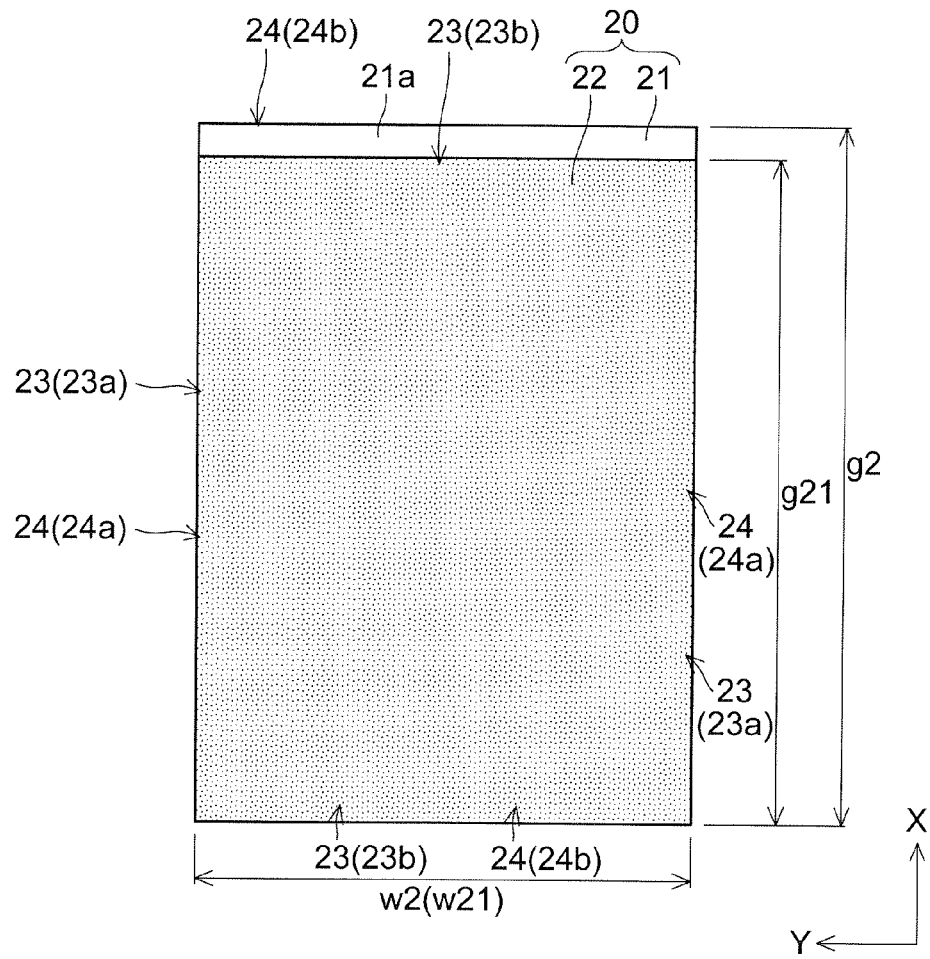
FIG. 9 is a plan view showing the configuration of the negative electrode of the lithium-ion rechargeable battery according to the first embodiment of the present invention.

As shown in FIGS. 8 and 9, the negative electrodes 20 constituting the electrode group 40 have a configuration in which negative electrode active material layers 22 are supported on both sides of a negative electrode collector 21.

The negative electrode collector 21 has the function of current collection for the negative electrode active material layers 22. The negative electrode collector 21 is composed of a metal foil of copper, nickel, stainless steel, iron, nickel plating, or the like, or of an alloy foil composed of an alloy of the abovementioned metals, and has a thickness of approximately 1 µm to 100 µm (e.g., approximately 16 µm). The negative electrode collector 21 is preferably a metal foil of copper or stainless steel, and the thickness thereof is preferably 4 µm to 20 µm. A collector formed by coating a metal with resin may also be used.

Besides a foil, the negative electrode collector 21 may also be a film, a sheet, a net, or a punched or expanded product, or may be in the shape of a lath, a porous body, a foam, a group of fibers, or the like.

The negative electrode active material layers 22 include a negative electrode active material capable of occluding and releasing lithium ions. Examples of negative electrode active materials include substances containing lithium, or substances that are capable of occluding and releasing lithium. In order to crease a battery having high energy density, the potential at which lithium is occluded/released is preferably close to the deposition/solution potential of metallic lithium. Typical examples of the negative electrode active material include particulate (squamous, bulk, fibrous, whisker, spherical, granulated, and other forms) natural graphite or artificial graphite.

Artificial graphite obtained by graphitizing mesocarbon microbeads, mesophase pitch powder, isotropic pitch powder, or the like may also be used as the negative electrode active material. Graphite particles having non-crystalline carbon adhering to the surfaces thereof may also be used. Lithium transition metal oxides, lithium transition metal nitrides, transition metal oxides, silicon oxides, and the like may also be used. When a lithium titanate such as $Li_4Ti_5O_{12}$, for example, is used as a lithium transition metal oxide, degradation of the negative electrodes 20 is reduced, and the battery can therefore be endowed with long service life.

The thickness of the negative electrode active material layers 22 described above is preferably about 20 µm to 2 mm, and more preferably about 50 µm to 1 mm.

The configuration of the negative electrode active material layers 22 is not particularly limited insofar as a negative electrode active material is included therein. For example, the negative electrode active material layers 22 may include materials other than the negative electrode active material, such as conductive materials, thickeners, binders, and the like. Materials that can be used in the positive electrode active material layers 12 may be used as the conductive materials, thickeners, binders, and other materials in the negative electrode active material layers 22.

The negative electrode 20 described above is formed by, for example, mixing the negative electrode active material, a conductive material, a thickener, and a binder, adding an appropriate solvent to form a negative electrode mixture in paste form, applying the paste to the surface of the negative electrode collector 21 and drying the paste, and applying compression as needed to increase the electrode density.

As shown in FIG. 9, the negative electrode 20 described above has a rectangular shape in plan view, and has four edges 24 (two edges 24a in the X direction and two edges 24b in the Y direction). The negative electrode 20 also has a larger planar area than the positive electrode 10 (see FIGS. 7 and 8). In the first embodiment, the width w2 of the negative electrode 20 in the Y direction is greater than the width w1 (see FIG. 7) of the positive electrode 10, and is approximately 154 mm, for example, and the length g2 of the negative electrode 20 in the X direction is greater than the length g1 (see FIG. 7) of the positive electrode 10, and is approximately 324 mm, for example.

The width w21 in the Y direction of the application region (formation region) of the negative electrode active material layers 22 is the same as the width w2 of the negative electrode 20, and is approximately 154 mm, for example, and the length g21 in the X direction is approximately 304 mm, for example. The negative electrode active material layers 22 formed in the application region therefore have a rectangular shape in plan view, and have four edges 23 (two edges 23a in the X direction and two edges 23b in the Y direction).

The negative electrode 20 has a collector exposure part 21a at one end thereof in the Y direction in which the negative electrode active material layers 22 are not formed and the surface of the negative electrode collector 21 is exposed, the same as in the positive electrode 10. A collector lead 5 (see FIG. 4) described hereinafter for extracting current to the outside is electrically connected to the collector exposure part 21a. The four edges 23 of the negative electrode active material layers 22 except for the Y-direction edge 23b on one side (the edge 23b on the side of the collector exposure part 21a) are aligned with the edges 14 of the positive electrode 10.

The separators 30 of the electrode group 40 should have adequate strength and ability to retain large quantities of the electrolyte solution, and from this standpoint, the separators 30 are preferably composed of a porous film, nonwoven cloth, or the like which includes polyethylene, polypropylene, or an ethylene-propylene copolymer and has a thickness of 10 µm to 50 µm and porosity of 30 to 70%.

Besides the materials described above, a porous film or the like composed of a polymer such as polyvinylidene fluoride, polyvinylidene chloride, polyacrylonitrile, polyacrylamide, polytetrafluoroethylene, polysulfone, polyethersulfone, polycarbonate, polyamide, polyimide, polyether (polyethylene oxide, polypropylene oxide), cellulose (carboxymethylcellulose, hydroxypropylcellulose), poly(meth)acrylic acid, and poly(meth)acrylic acid ester may be used to form the separators 30. A multilayer film obtained by superposing these porous films may also be used.

The thickness of the separators 30 is preferably 5 µm to 100 µm, and more preferably 10 µm to 30 µm. The porosity of the separators 30 is preferably 30% to 90%, and more preferably 40% to 80%. When the thickness of the separators 30 is less than 5 µm, the mechanical strength of the separators 30 is inadequate, and internal short-circuiting can occur in the battery. When the thickness of the separators 30 is greater than 100 µm, the distance between positive and negative electrodes increases, and the internal resistance of the battery increases. When the porosity is less than 30%, the content ratio of the non-aqueous electrolyte solution decreases, and the internal resistance of the battery increases. When the porosity is greater than 90%, physical contact occurs between the positive electrodes 10 and the negative electrodes 20 and causes internal short-circuiting of the battery. Multiple separators 30 may also be overlapped and used out of consideration for mechanical strength, content ratio of the non-aqueous electrolyte solution, internal resistance of the battery, and risk of internal short-circuiting of the battery, according to the thickness and porosity of the separators 30.

Figure 10:
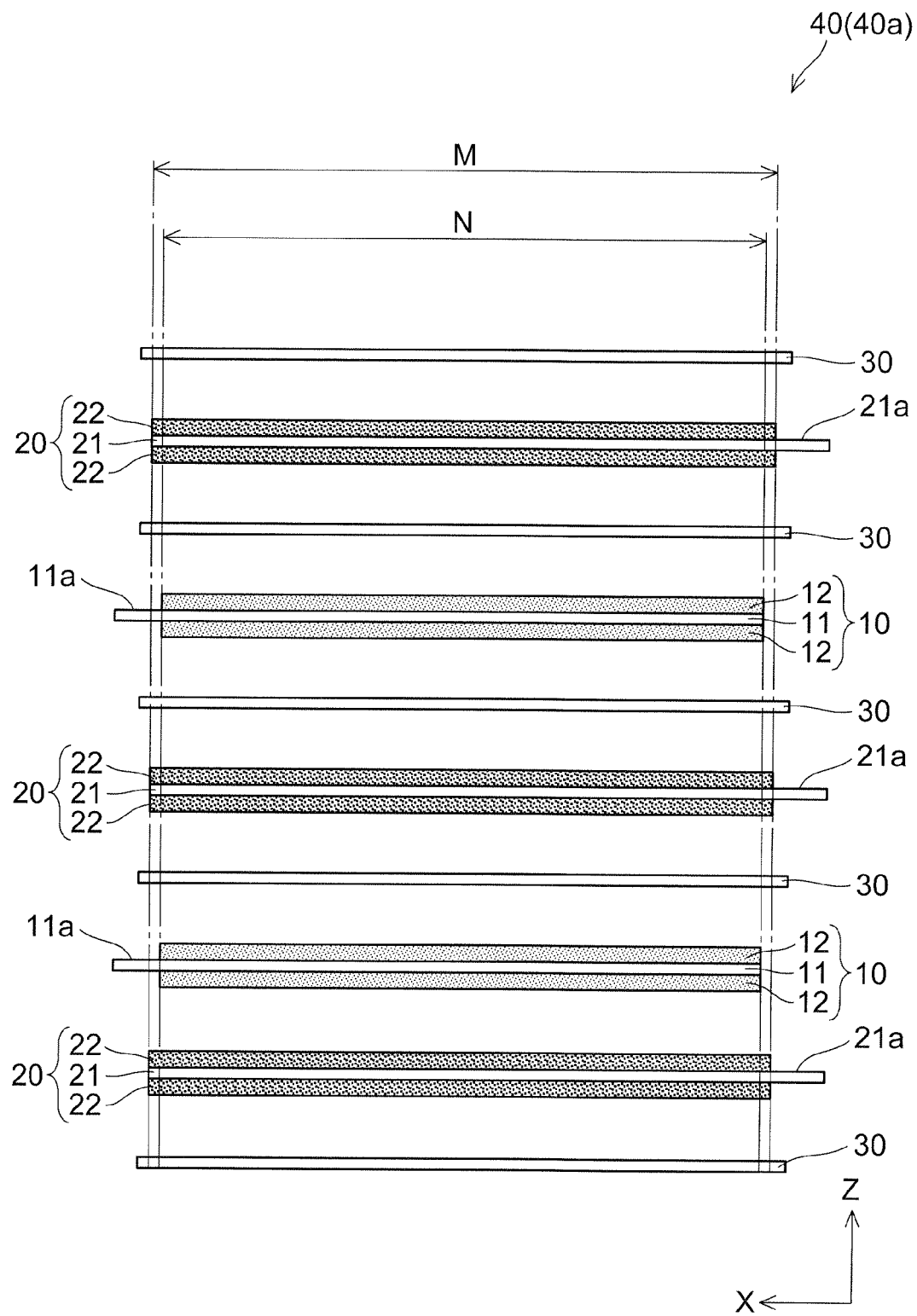
FIG. 10 is a sectional view showing the configuration of the electrode group of the lithium-ion rechargeable battery according to the first embodiment of the present invention.

As shown in FIG. 10, the separators 30 have a shape larger than the application region (formation region N) of the positive electrode active material layers 12 and the application region (formation region M) of the negative electrode active material layers 22. Specifically, as shown in FIGS. 5 and 10, the separators 30 have a rectangular shape with a length in the longitudinal direction (length in the direction corresponding to the X direction) of approximately 310 mm, and a length in the transverse direction (length in the direction corresponding to the Y direction) of approximately 160 mm, for example.

The positive electrodes 10 and negative electrodes 20 are arranged so that the collector exposure parts 11a of the positive electrodes 10 and the collector exposure parts 21a of the negative electrodes 20 are positioned opposite each other, and the separators 30 are interposed between the positive electrodes and negative electrodes of the stack.

The non-aqueous electrolyte solution sealed within the exterior container 60 with the electrode group 40 is not particularly limited, and solvents that can be used therein include ethylene carbonate (EC), propylene carbonate, butylene carbonate, diethyl carbonate (DEC), dimethyl carbonate, methyl ethyl carbonate, γ-butyrolactone, and other esters; tetrahydrofuran, 2-methyltetrahydrofuran, dioxane, dioxolane, diethyl ether, dimethoxyethane, diethoxyethane, methoxyethoxy ethane, and other ethers; dimethyl sulfoxide, sulfolane, methyl sulfolane, acetonitrile, methyl formate, methyl acetate, and other polar solvents, for example. These solvents may be used singly or as mixtures of two or more types thereof.

The non-aqueous electrolyte solution may include an electrolyte support salt. Examples of electrolyte support salts include $LiClO_4$, $LiBF_4$ (lithium tetrafluoroborate), $LiPF_6$ (lithium hexafluorophosphate), $LiCF_3SO_3$ (lithium trifluoromethanesulfonate), LiF (lithium fluoride), LiCl (lithium chloride), LiBr (lithium bromide), LiI (lithium iodide), $LiAlCl_4$ (lithium tetrachloroaluminate), and other lithium salts. These salts may be used singly or as mixtures of two or more types thereof.

The concentration of the electrolyte support salt is not particularly limited, but is preferably 0.5 mol/L to 2.5 mol/L, and more preferably 1.0 mol/L to 2.2 mol/L. When the concentration of the electrolyte support salt is less than 0.5 mol/L, the carrier concentration for carrying charges in the non-aqueous electrolyte solution decreases, and there is a risk of increased resistance of the non-aqueous electrolyte solution. When the concentration of the electrolyte support salt is higher than 2.5 mol/L, the degree of dissociation of the salt as such is reduced, and the carrier concentration in the non-aqueous electrolyte solution may not increase.

The exterior container 60 in which the electrode group 40 is sealed is a large, flat rectangular container, and includes an exterior canister 70 for housing the electrode group 40 and other components, and a sealing plate 80 for sealing the exterior canister 70, as shown in FIGS. 1 through 3. The exterior canister 70 in which the electrode group 40 is housed is seam sealed (preferably double-seam sealed) by the sealing plate 80. The exterior canister 70 is an example of the "housing container" of the present invention, and the sealing plate 80 is an example of the "sealing body" of the present invention.

Figure 11:
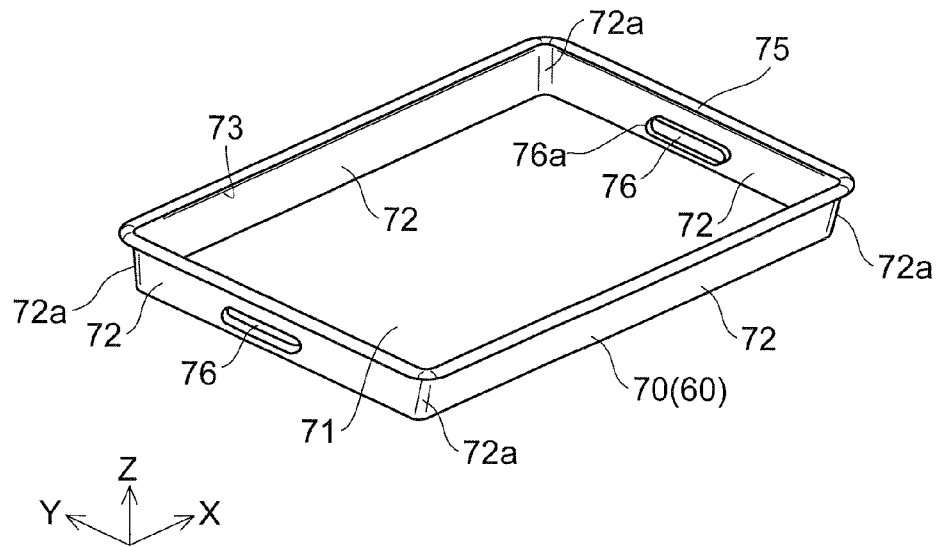
FIG. 11 is a perspective view showing the exterior canister of the lithium-ion rechargeable battery according to the first embodiment of the present invention.
Figure 12:
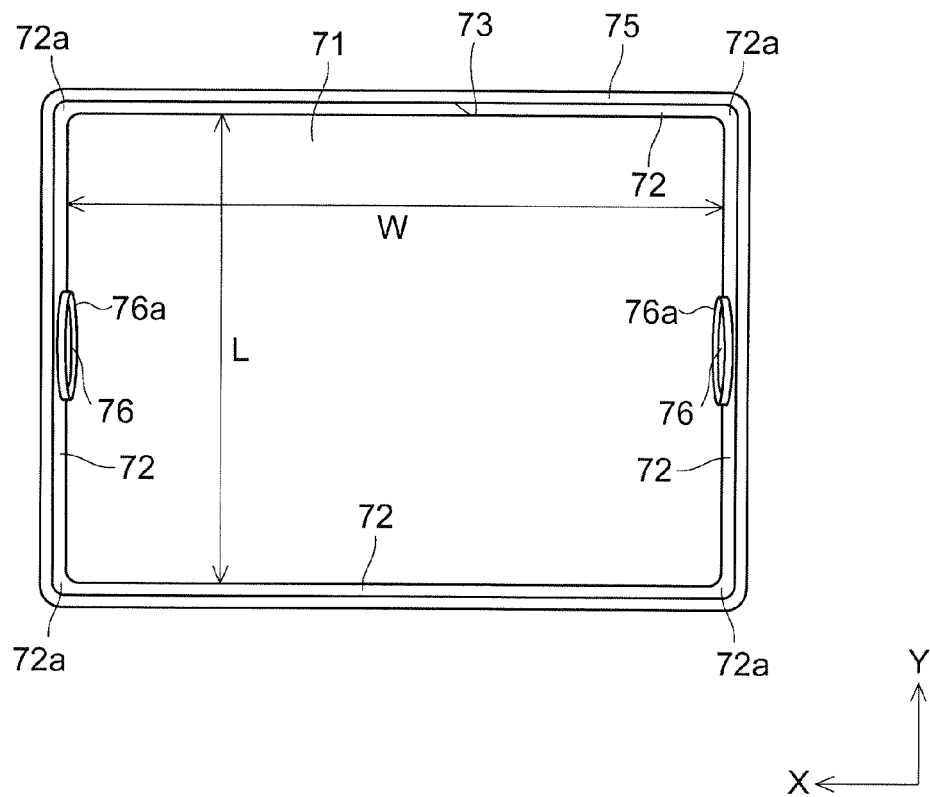
FIG. 12 is a top view showing the exterior canister of the lithium-ion rechargeable battery according to the first embodiment of the present invention.

The exterior canister 70 is formed by drawing or otherwise working a metal plate, for example, and has a bottom part 71 and side walls 72. As shown in FIGS. 11 and 12, through-holes 76, 76 for inserting electrode terminals 90, 90 are provided opposite each other in the side walls 72 parallel to the Y direction by stamping or another process. The through-holes 76 have an elliptical shape, for example, such as shown in FIG. 11, and through-hole folded parts 76a folded inward to a degree that allows crimp-joining with the electrode terminals 90 formed at the peripheral edges thereof.

An opening 73 for inserting the electrode group 40 is also provided at one end (the side opposite the bottom part 71) of the exterior canister 70. The exterior canister 70 is formed as a prismatic canister, and the area of the substantially rectangular opening 73 is larger than the area of the substantially rectangular bottom part 71. In other words, the four corners 72a of the side walls 72 spread linearly toward the opening 73 from the bottom part 71. Furthermore, a container folded part 75 for seam sealing (preferably, double-seam sealing) is provided at the peripheral edge of the opening 73 of the exterior canister 70.

The inside diameter of the exterior canister 70 is sufficiently large to enable the electrode group 40 to be housed so that the electrode surface thereof faces the bottom part 71. Specifically, the exterior canister 70 is fanned so that the length in the longitudinal direction (length L in the Y direction of FIG. 12) of the bottom part 71 is approximately 180 mm, and the length in the transverse direction (length W in the X direction of FIG. 12) of the bottom part 71 is approximately 350 mm, for example. The depth of the exterior canister 70 is approximately 40 mm, for example.

The sealing plate 80 is formed by pressing a metal plate, for example. As shown in FIG. 2, the sealing plate 80 has a substantially flat rectangular panel part 81 for blocking the opening 73 of the exterior canister 70; a chuck wall 82 which extends upward continuously with the outer peripheral edge of the panel part 81; and a folded part 83 which is connected to the outer peripheral edge of the chuck wall 82. As shown in FIGS. 2 and 3, a fill hole 84 for filling the non-aqueous electrolyte solution is also formed on one side in the X direction. The fill hole 84 is formed having a diameter ø of 2 mm.

The exterior canister 70 and the sealing plate 80 may be formed using a metal plate of a material resistant to the electrolyte solution, e.g., iron, stainless steel, aluminum, or another metal, or using a steel plate in which a nickel plating is applied to iron, or an aluminum-plated steel plate or the like. Iron is an inexpensive material and is therefore preferred from a cost standpoint, but the use of a metal plate of stainless steel (SUS), aluminum, or the like, a steel plate in which a nickel plating is applied to iron (Fe—Ni), a steel plate in which an aluminum plating is applied to iron (Fe—Al), or the like is more preferred to ensure long-term reliability.

A laminate material (laminate plate) in which the surface of a metal plate is laminated with a polymer resin may also be used. In this case, a single-sided laminate material in which one side (the outer side or the inner side toward the battery) is laminated, or a double-sided laminate material in which both sides are laminated may be used as appropriate. The use of a laminate material gives the exterior canister 70 enhanced strength relative to a case in which only a metal plate is used. Laminating the outside of the battery with a polymer material that is resistant to the electrolyte solution also makes it possible to use a metal plate that has minimal resistance to the electrolyte solution. Contamination of the exterior can also be suppressed by laminating the outside of the battery with a polymer material.

The thickness of the metal plate may be approximately 0.5 mm to approximately 2 mm (e.g., approximately 0.8 mm). The metal plate may have any composition when part of a double-sided laminate material, but in the case that a single-sided laminate material or a non-laminated material is on the outside of the battery, a material must be used that is resistant to the electrolyte solution. Polyethylene (PE), polypropylene (PP), or the like may be used as the polymer material for lamination.

In double-seam sealing of the exterior canister 70 and sealing plate 80 described above, the degree of overlap (ratio of overlap) of double seaming, i.e., the ratio of the length of the portion where the folded part 83 and the container folded part 75 overlap with respect to the length of the double seam portion, is set to 70% or greater, thereby ensuring adequate airtightness and strength to withstand increases in the internal pressure of the battery.

Figure 14A:
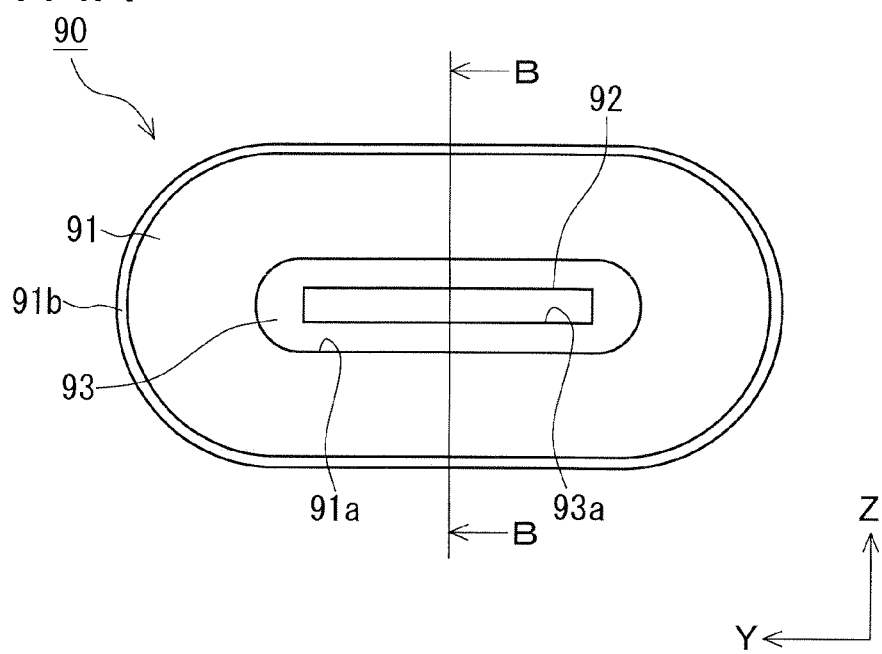
FIG. 14A is a front view showing an electrode terminal of the lithium-ion rechargeable battery according to the first embodiment of the present invention.
Figure 14B:
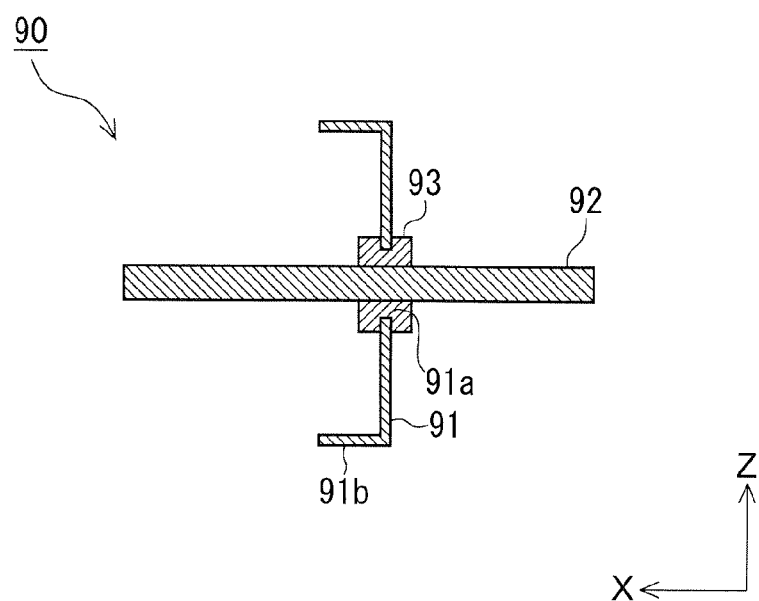
FIG. 14B is a sectional view along line B-B of FIG. 14A.

The electrode terminals 90, 90 are crimp joined from the inside of the battery in the through-holes 76, 76, respectively, of the exterior canister 70. Good workability is achieved by crimp joining the exterior canister 70 and the electrode terminals 90 after the electrode terminals 90 and the electrode group 40 are electrically connected outside the exterior canister 70. As shown in FIGS. 14A and 14B, the electrode terminals 90 each have a metal base part 91 having a through-hole 91a; a metal terminal part 92 passed through the through-hole 91a; and an insulation part 93 for insulating the terminal part 92 and the base part 91.

The base part 91 has an elliptical shape somewhat larger than the through-holes 76 of the exterior canister 70, and the peripheral edge thereof is folded outward to a degree that allows crimp-joining with the through-hole folded part 76a, and a base folded part 91b is thus formed. During crimp-joining, components are attached so that the base folded part 91b covers the through-hole folded part 76a, as shown in FIG. 15A.

The terminal part 92 is a flat plate-shaped metal terminal sized so as not to touch the through-hole 91a. The insulation part 93 is a donut-shaped insulating material having a through-hole 93a, and rubber or another insulative resin can be used to form the insulation part 93. A groove is formed in the outer periphery of the insulation part 93, and the groove is fitted into the through-hole 91a of the base part 91. The terminal part 92 is inserted tightly into the through-hole 93a.

Figure 15A:
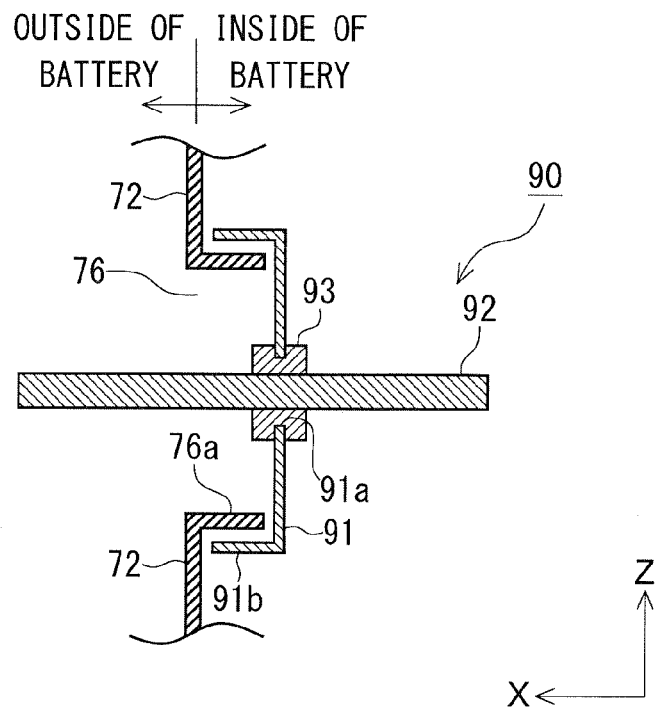
FIG. 15A is a sectional view showing the relevant parts of the lithium-ion rechargeable battery according to the first embodiment of the present invention in a state in which the electrode terminal prior to crimp joining is attached to the exterior container.
Figure 15B:
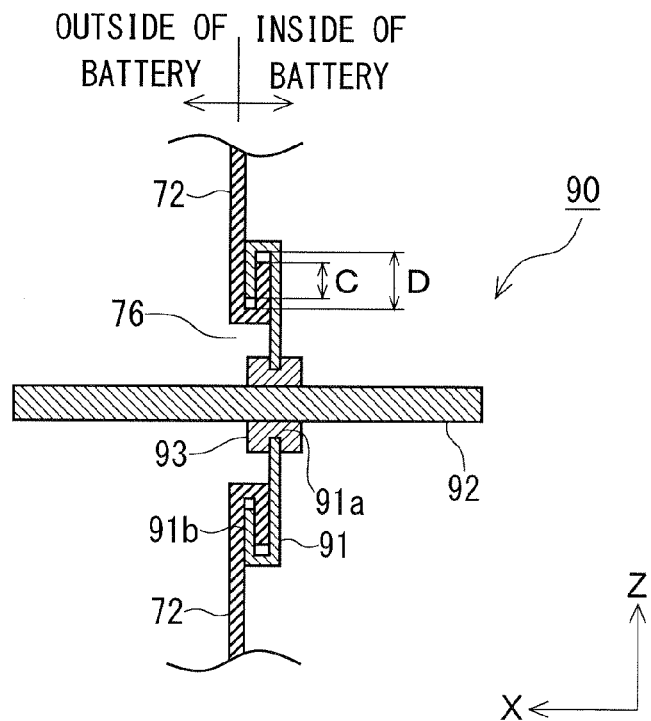
FIG. 15B is a sectional view showing the relevant parts of the lithium-ion rechargeable battery according to the first embodiment of the present invention in a state in which the electrode terminal is crimp joined to the exterior container.

As shown in FIG. 15A, after the base folded part 91b is placed so as to cover the through-hole folded part 76a, crimping is performed and the electrode terminal 90 is fixed from the inside of the exterior canister 70 by crimp joining (preferably, folded crimp-joining) in the manner shown in FIG. 15B. Greater airtightness can be achieved by applying a sealing material (not shown) to the pressure-welded portions.

In FIG. 15B, the length C is the length over which the distal end area of the through-hole folded part 76a and the distal end area of the base folded part 91b overlap each other, and the length D is the length from the inside of the folded portion of the through-hole folded part 76a to the inside of the folded portion of the base folded part 91b. Here, airtightness and strength (pressure resistance) sufficient to withstand, increases in the internal pressure of the battery can be ensured by setting the degree of overlap (ratio of overlap) in folded crimp-joining, i.e., the ratio of the length C to the length D, to 50% or greater.

Since the electrode terminals 90 are crimp joined from inside the battery, in a case in which the internal pressure of the battery increases, force acts on the crimp-joined portion in the direction of strengthening the joint, and the battery therefore has excellent pressure resistance and airtightness.

As shown in FIG. 4, the electrode group 40 described above is housed inside the exterior canister 70 so that the positive electrodes 10 (see FIG. 5) and negative electrodes 20 (see FIG. 5) face the bottom part 71 of the exterior canister 70. As shown in FIG. 4, the collector exposure part 11a (see FIG. 7) of the positive electrode 10 and the collector exposure part 21a (see FIG. 9) of the negative electrode 20 are each electrically connected to an electrode terminal 90 via a collector lead 5. The collector leads 5 may be formed using the same material as the collectors, or a different material may be used.

In the case that the electrode terminals 90 and the electrode group 40 are electrically connected after the exterior canister 70 and the electrode terminals 90 are crimp-joined, the collector leads 5 are preferably connected in a state in which the electrode group 40 is removed from the exterior canister 70 in order to facilitate connection, and the collector leads 5 must be lengthened. However, the collector leads 5 can be shortened in a case in which the electrode terminals 90 and the electrode group 40 are electrically connected outside the exterior canister 70 in advance before the exterior canister 70 and the electrode terminals 90 are crimp-joined.

Figure 13:
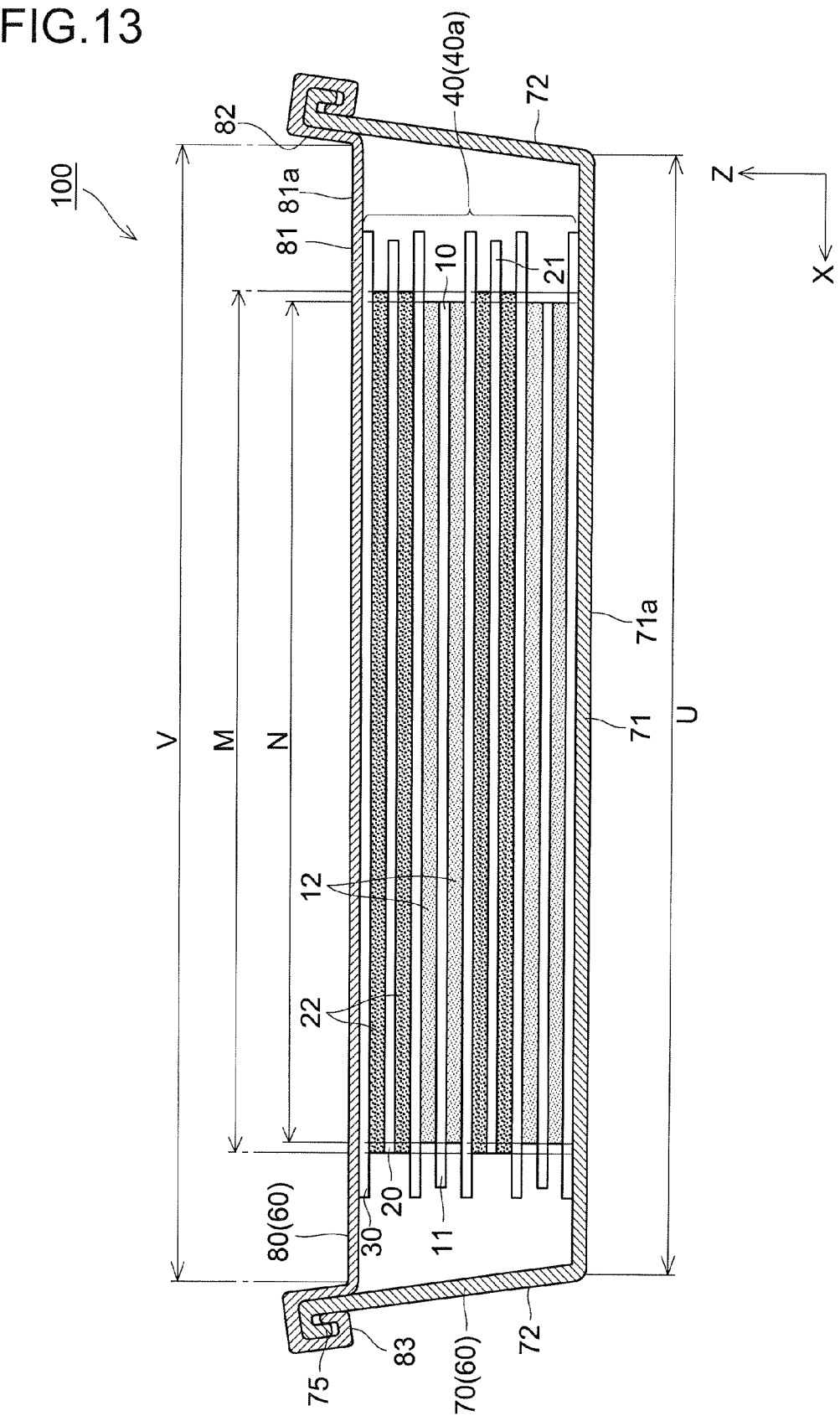
FIG. 13 is a sectional view along line A-A of FIG. 3.

As shown in FIG. 13, the opening 73 of the exterior canister 70 is double-seam sealed by the sealing plate 80. Specifically, the distal end portion of the folded part 83 of the sealing plate 80 is pressure welded so as to be enfolded in the container folded part 75 of the exterior canister 70, and the sealing plate 80 is thereby attached to the exterior canister 70. The sealing plate 80 is sealed throughout the entire periphery of the opening 73. Greater airtightness can be achieved by applying a sealing material (not shown) to the pressure-welded portions.

The panel part 81 of the sealing plate 80 is positioned a predetermined distance lower (toward the bottom part 71) than the peripheral edge of the opening 73 of the exterior canister 70 by the chuck wall 82. A pressing force in the stacking direction (depth direction of the exterior canister 70; Z direction) is applied to the electrode group 40 (stack 40a) in the state in which the electrode group 40 is housed in the exterior container 60, and the positive electrodes 10 and negative electrodes 20 are thereby bound together with the separators 30 therebetween.

As shown in FIG. 13, the length U in the transverse direction (X direction) of an outer bottom surface 71a on the outside of the bottom part 71 is somewhat less than the length V in the transverse direction (X direction) of an outer top surface 81a on the outside of the panel part 81. Likewise, the length of the outer bottom surface 71a in the longitudinal direction (Y direction) is somewhat less than the length of the outer top surface 81a in the longitudinal direction (Y direction). Consequently, the outer bottom surface 71a and a depression formed by the outer bottom surface 71a are shaped so as to substantially fit together. Since a plurality of lithium-ion rechargeable batteries 100 can therefore be substantially fit together vertically and stacked, the batteries can be used as a battery pack. The depth (height of the chuck wall 82) of the depression formed by the sealed panel part 81 and chuck wall 82 is preferably about 1 to 20 mm.

In the case that the exterior canister 70 and the sealing plate 80 are double-seam sealed in a manner such as shown in FIG. 13, whether conduction occurs or insulation is present between the exterior canister 70 and the sealing plate 80 is determined as described below by the combination of materials used to form the exterior canister 70 and the sealing plate 80.

First, in a combination in which conduction occurs between the exterior canister 70 and the sealing plate 80, in the case that a single-sided laminate material laminated on the inside of the battery is used for the exterior canister 70, a non-laminated metal plate or a single-sided laminate material laminated on the inside or outside of the battery is used as the sealing plate 80. In the case that a single-sided laminate material laminated on the outside of the battery is used for the exterior canister 70, a non-laminated metal plate or a single-sided laminate material laminated on the outside of the battery is used as the sealing plate 80. In the case that a non-laminated metal plate is used for the exterior canister 70, a non-laminated metal plate or a single-sided laminate material laminated on the inside or outside of the battery is used as the sealing plate 80.

In a combination in which insulation is present between the exterior canister 70 and the sealing plate 80, in the case that a single-sided laminate material laminated on the inside of the battery is used for the exterior canister 70, a double-sided laminate material is used as the sealing plate 80. In the case that a single-sided laminate material laminated on the outside of the battery is used for the exterior canister 70, a double-sided laminate material or a single-sided laminate material laminated on the inside of the battery is used as the sealing plate 80. In the case that a double-sided laminate material is used for the exterior canister 70, a non-laminated metal plate, a double-sided laminate material, or a single-sided laminate material laminated on the inside or outside of the battery is used as the sealing plate 80. In the case that a non-laminated metal plate is used for the exterior canister 70, a double-sided laminate material is used as the sealing plate 80.

The non-aqueous electrolyte solution is vacuum-filled, for example, from the fill hole 84 after the opening 73 of the exterior canister 70 is sealed by the sealing plate 80. After a metal sphere 89 (see FIG. 3) having substantially the same diameter as the fill hole 84 is placed in the fill hole 84, the fill hole 84 is sealed by resistance welding, laser welding, or another technique.

In the lithium-ion rechargeable battery 100 of the first embodiment, a safety valve (not shown) for releasing internal pressure of the battery is provided in order to prevent battery explosion and other danger when the internal pressure of the battery increases in high temperature or when overcharge occurs. The sealing plate 80 is attached with a sealing strength such that the pressure resistance of the sealed portion is equal to or greater than the operating pressure of the safety valve, so that the exterior container 60 does not open before the safety valve operates. Instead of providing a safety valve, a configuration may be adopted in which the sealed portion of the exterior container 60 is designed to have a pressure resistance about equal to the operating pressure of the safety valve, and the internal pressure of the battery is released by opening of the sealed portion when there is an increase in the internal pressure of the battery.

The lithium-ion rechargeable battery 100 of the first embodiment configured as described above can be suitably used as a stationary electric power storage battery from which long service life is required. The lithium-ion rechargeable battery 100 can also be suitably used as an automotive storage battery for a hybrid automobile (HEV), an electric automobile (EV), or the like. The lithium-ion rechargeable battery 100 according to the first embodiment is also suitable for storage batteries having a single-cell capacity of 10 Ah or greater, and particularly for large-capacity storage batteries having a single-cell capacity of 50 Ah or greater. The weight of a single cell is preferably 1 kg or greater. A module is preferably formed by connecting single cells in eight-cell units in series. Modules are preferably combined two at a time and operated at an average of 48 V or greater. Midnight power, electric power obtained from solar cells or by wind generation, or other power is preferably used for charging.

An example of the lithium-ion rechargeable battery 100 of the first embodiment and the method of manufacture thereof will next be described.

[Manufacture of the Positive Electrode]

A positive electrode mixture slurry was first prepared by mixing $LiFePO_4$ (90 parts by weight) as an active material, acetylene black (5 parts by weight) as a conductive material, styrene butadiene rubber (3 parts by weight) as a binder, and CMC (2 parts by weight) as a thickener, then adding an appropriate amount of water to form a dispersion. The positive electrode mixture slurry was then uniformly applied to both sides of an aluminum collector (positive electrode collector) having a thickness of 20 μm, dried, and then compressed by a roll press to a thickness of 400 μm. A positive electrode (positive electrode plate) was then fabricated by cutting to the desired size. The size of the region in which the active material layer of the positive electrode was applied was 150 mm long and 300 mm wide, and the positive electrode (positive electrode collector) was 150 mm long and 320 mm wide.

[Manufacture of the Negative Electrode]

A negative electrode mixture slurry was prepared by mixing natural graphite (98 parts by weight) as an active material, styrene butadiene rubber (1 part by weight) as a binder, and CMC (1 part by weight) as a thickener, then adding an appropriate amount of water to form a dispersion. The negative electrode mixture slurry was then uniformly applied to both sides of a copper collector (negative electrode collector) having a thickness of 16 μm, dried, and then compressed by a roll press to a thickness of 350 μm. A negative electrode (negative electrode plate) was then fabricated by cutting to the desired size. The size of the region in which the active material layer of the negative electrode was applied was 154 mm long and 304 mm wide, and the negative electrode (negative electrode collector) was 154 mm long and 324 mm wide.

[Production of the Non-aqueous Electrolyte Solution]

A non-aqueous electrolyte solution was produced by dissolving 1 mol/L of $LiPF_6$ in a mixed solution (solvent) obtained by mixing ethylene carbonate (EC) and diethyl carbonate (DEC) in a 3:7 volume ratio.

[Assembly of the Rechargeable Battery]

An electrode group (stack) was formed by stacking positive electrode plates and negative electrode plates in the order of positive electrode plate, separator, negative electrode plate, separator, and so on so that separators were inserted between positive electrode plates and negative electrode plates. At this time, 50 positive electrode plates and 51 negative electrode plates were used so that negative electrode plates were positioned on the outsides of positive electrode plates. By using 102 separators, a configuration was obtained in which separators were positioned on the outermost sides of the electrode group (stack).

Porous polyethylene film having a thickness of 20 μm was used to form the separators. The separators were 160 mm long and 310 mm wide so as to be larger than the regions in which the active material layers of the positive and negative electrode plates were applied.

The exterior canister and the sealing plate of the exterior container were formed by working a nickel-plated steel sheet having a thickness of approximately 0.8 mm. As for the inside size of the exterior canister, the length of the bottom part was 180 mm, the width of the bottom part was 350 mm, and the depth of the exterior canister was 40 mm. Positive electrode terminals having stainless steel base parts and aluminum terminal parts, and negative electrode terminals having stainless steel base parts and copper terminal parts were formed as the electrode terminals.

After the electrode group and the electrode terminals were electrically connected via the collector leads 5, the electrode group and electrode terminals were housed in the exterior canister, and the electrode terminals were joined by folded crimping to the exterior canister. The sealing plate was then placed thereon and the battery sealed by double-seam sealing. In this configuration, attachment of the sealing plate causes a pressing force to be applied in the stacking direction to the electrode group. At this time, pressure was applied to the electrode group by the sealing plate so that the ratio of the amount of compression with respect to the thickness of the electrode group in the stacking direction was 10%. Specifically, the sealing plate was fixed at a position compressed inward approximately 1 mm from the position thereof in a state in which the electrode group and the sealing plate are in direct or indirect contact with each other.

A predetermined quantity of the non-aqueous electrolyte solution was then vacuum filled from the ø 2 mm fill hole provided in advance in the sealing plate. After filling, a metal sphere having substantially the same diameter as the fill hole was placed in the fill hole, the fill hole was sealed by resistance welding, and a lithium-ion rechargeable battery 100 was thereby obtained.

Second Embodiment

Figure 16:
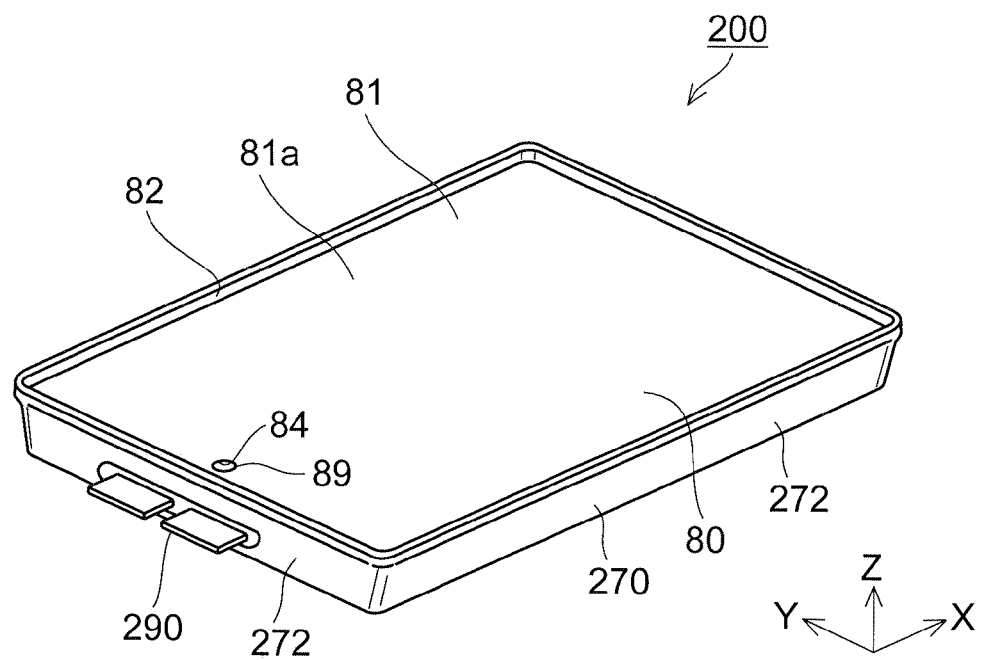
FIG. 16 is an overall perspective view showing the lithium-ion rechargeable battery according to a second embodiment of the present invention.
Figure 17A:
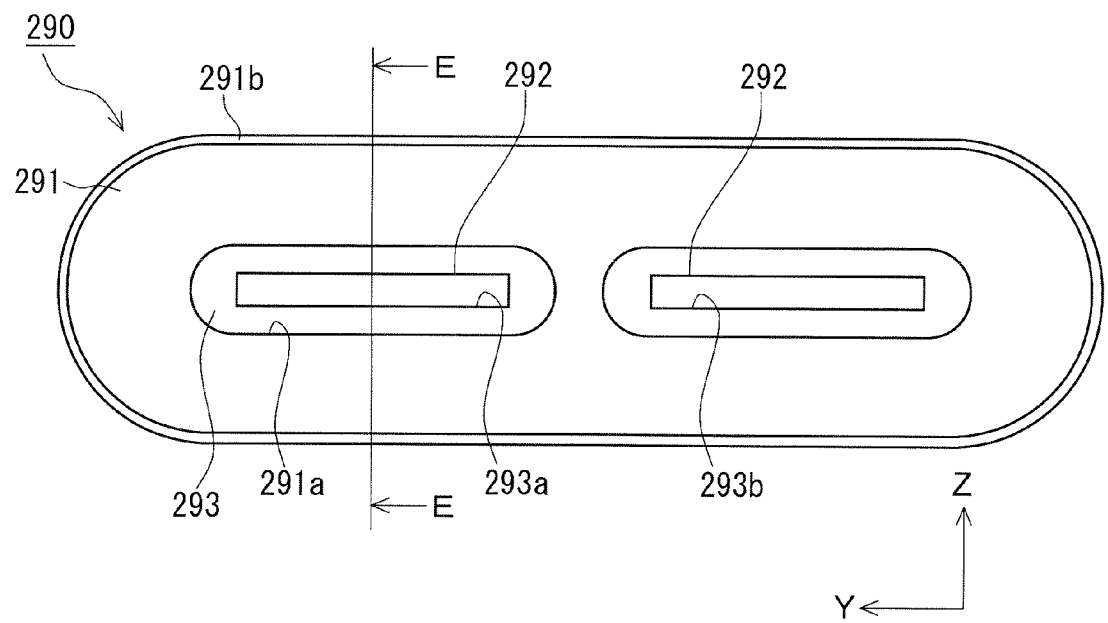
FIG. 17A is a front view showing the electrode terminals of the lithium-ion rechargeable battery according to the second embodiment of the present invention.
Figure 17B:
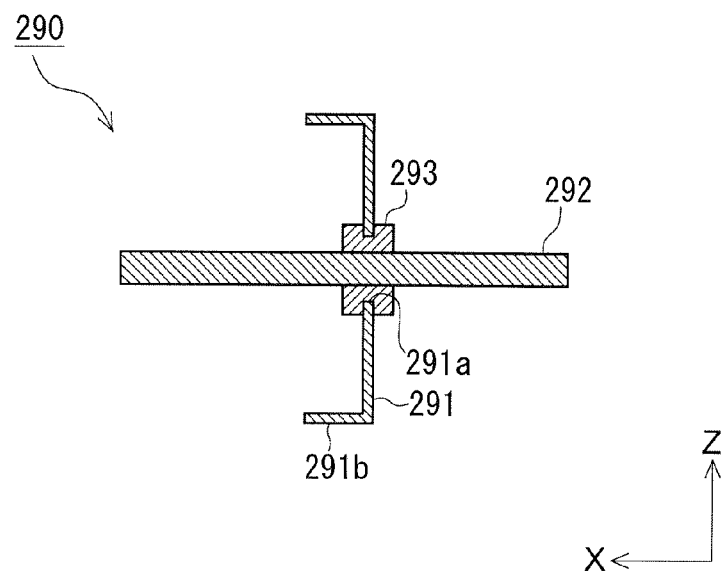
FIG. 17B is a sectional view along line E-E of FIG. 17A.

FIG. 16 is an overall perspective view showing the lithium-ion rechargeable battery according to a second embodiment of the present invention, FIG. 17A is a front view showing the electrode terminals of the lithium-ion rechargeable battery according to the second embodiment of the present invention, and FIG. 17B is a sectional view along line E-E of FIG. 17A.

The lithium-ion rechargeable battery 200 of the second embodiment differs from the lithium-ion rechargeable battery 100 of the first embodiment in that both the electrode terminals are provided to the same wall of the exterior canister, and the accompanying members thereof are also in different positions. All other aspects of the lithium-ion rechargeable battery 200 are the same as in the lithium-ion rechargeable battery 100 of the first embodiment, and only the aspects of the second embodiment that differ from the first embodiment are described in detail below.

The exterior canister 270 differs from the exterior canister 70 of the first embodiment only with respect to the position and size of a through-hole 276. A single through-hole 276 is provided in a side wall 272 parallel to the Y direction. The through-hole 276 has an elliptical shape such as shown in FIG. 16, for example, and a through-hole folded part (not shown) is formed therein by folding in a peripheral edge thereof to a degree that allows crimp joining with an electrode terminal 290.

An electrode terminal 290 is crimp joined from inside the battery to each through-hole 276 of the exterior canister 270. Crimp-joining of the exterior canister 270 and the electrode terminal 290 is facilitated by electrically connecting the electrode terminal 290 and the electrode group outside of the exterior canister 270. As shown in FIGS. 17A and 17B, the electrode terminal 290 has a metal base part 291 having through-holes 291a, 291b; metal terminal parts 292, 292 passed through the through-holes 291a, 291b; and an insulating part 293 for insulating the terminal parts 292 and the base part 291.

The base part 291 has an elliptical shape somewhat larger than the through-hole 276 of the exterior canister 270, and the peripheral edge thereof is folded outward to a degree that allows crimp joining with the through-hole folded part 276a, and a base folded part 291b is thus formed. During crimp-joining, components are attached so that the base folded part 291b covers the through-hole folded part 276a.

The terminal part 292 is a flat plate-shaped metal terminal sized so as not to touch the through-hole 291a. The insulation part 293 is an insulating material having two through-holes 293a, 293b, and rubber or another insulative resin can be used to form the insulation part 293. A groove is formed in the outer periphery of the insulation part 293, and the groove is fitted into the through-hole 291a of the base part 291. Each terminal part 292 is inserted tightly into the respective through-hole 293a or 293b thereof.

As shown in FIG. 15A, after the base folded part 291b is placed so as to cover the through-hole folded part 276a, crimping is performed and the electrode terminal 290 is fixed from the inside of the exterior canister 270 by crimp-joining (preferably, folded crimp-joining) in the manner shown in FIG. 15B. Greater airtightness can be achieved by applying a sealing material (not shown) to the pressure-welded portions.

In the lithium-ion rechargeable battery 200 of the second embodiment, the collector exposure parts of the positive electrodes and the negative electrodes in the electrode group are aligned on the same side as the electrode terminal 290, and can thereby be connected by short collector leads. The electrode terminal 290 is described above as having one base part 291, but two of the electrode terminals 90 of the first embodiment may also be arranged.

The rechargeable battery of the present invention can thus also be used in applications in which the electrode terminals are accessed from the same side.

Third Embodiment

Figure 18:
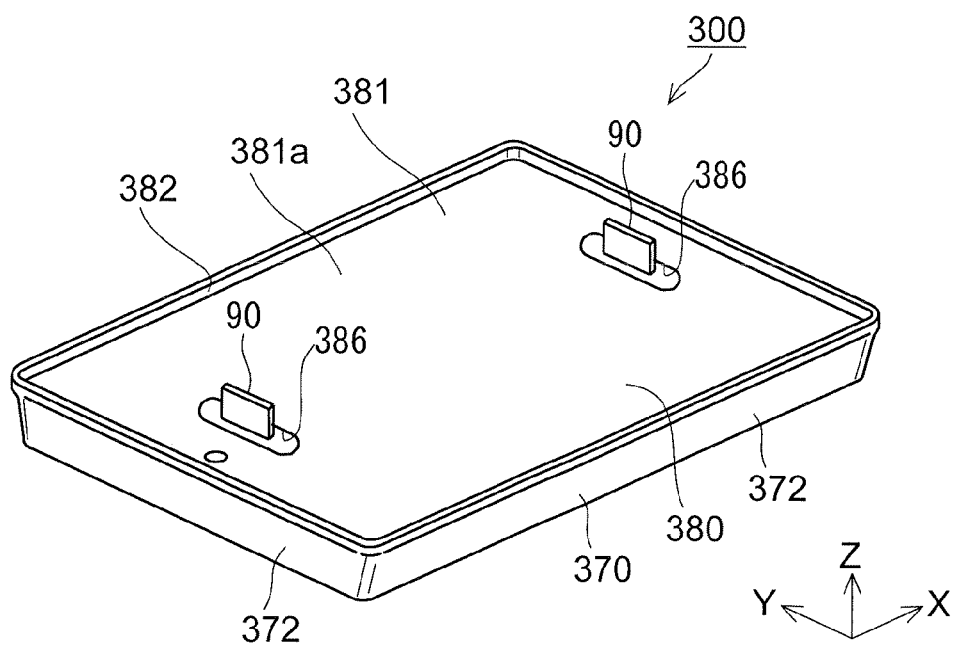
FIG. 18 is an overall perspective view showing the lithium-ion rechargeable battery according to a third embodiment of the present invention.

FIG. 18 is an overall perspective view showing the lithium-ion rechargeable battery according to a third embodiment of the present invention.

The lithium-ion rechargeable battery 300 of the third embodiment differs from the lithium-ion rechargeable battery 100 of the first embodiment in that both the electrode terminals are provided to the sealing plate, and the accompanying members thereof are also in different positions. All other aspects of the lithium-ion rechargeable battery 300 including the configuration of the electrode terminals 90 are the same as in the lithium-ion rechargeable battery 100 of the first embodiment, and only the aspects of the third embodiment that differ from the first embodiment are described in detail below.

The sealing plate 380 differs from the sealing plate 80 of the first embodiment in having two through-holes 386, 386. The through-holes 386, 386 are preferably provided near the collector exposure parts of the electrode group so that the collector leads can be short. FIG. 18 shows a case in which the electrode group 40 of the first embodiment is used, and the through-holes 386, 386 are provided near the ends of the sealing plate 380 in the X direction.

Since the electrode terminals 90 of the first embodiment as used as the electrode terminals, the through-holes 386 have an elliptical shape such as shown in FIG. 18, for example, and through-hole folded parts (not shown) are formed therein by folding in the peripheral edged thereof to a degree that allows crimp-joining with electrode terminals 90.

The electrode terminals 90, 90 are crimp-joined from the inside of the battery in the through-holes 386, 386, respectively, of the sealing plate 380. Good workability is achieved by crimp-joining the sealing plate 380 and the electrode terminals 90 after the electrode terminals 90 and the electrode group 40 are electrically connected outside the exterior canister 370.

As shown in FIG. 15A, after the base folded part 91*b* is placed so as to cover the through-hole folded part, crimping is performed and each electrode terminal 90 is fixed from the inside of the sealing plate 380 by crimp joining (preferably, folded crimp-joining) in the manner shown in FIG. 15B. Greater airtightness can be achieved by applying a sealing material (not shown) to the pressure-welded portions.

Two of the electrode terminals 90 of the first embodiment are used in the above description, but the electrode terminal 290 of the second embodiment may also be used.

The rechargeable battery of the present invention can thus also be used in applications in which the electrode terminals are accessed from the top surface (sealing plate).

Other Embodiments of the Electrode Terminal

Figure 19A:
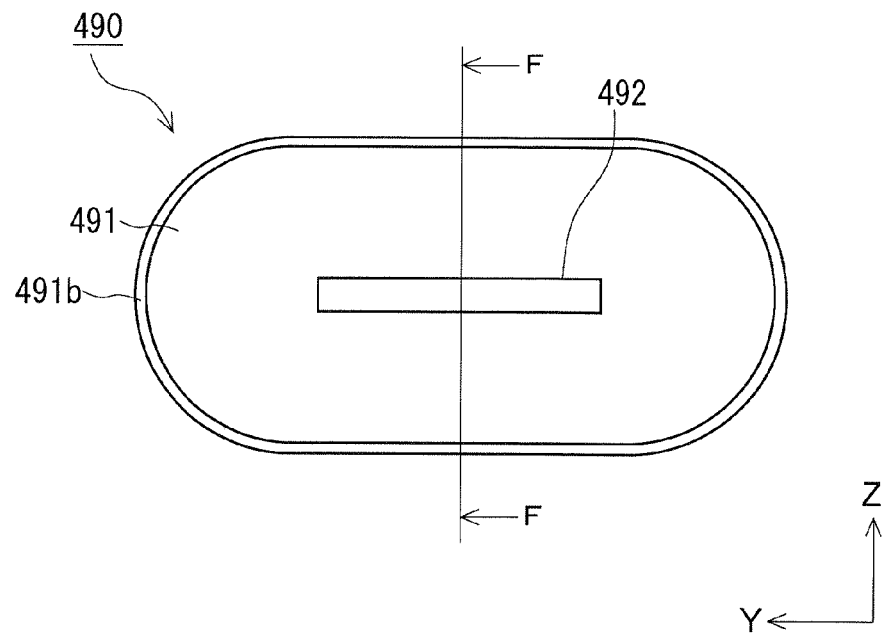
FIG. 19A is a front view showing another electrode terminal of the lithium-ion rechargeable battery according to the present invention.
Figure 19B:
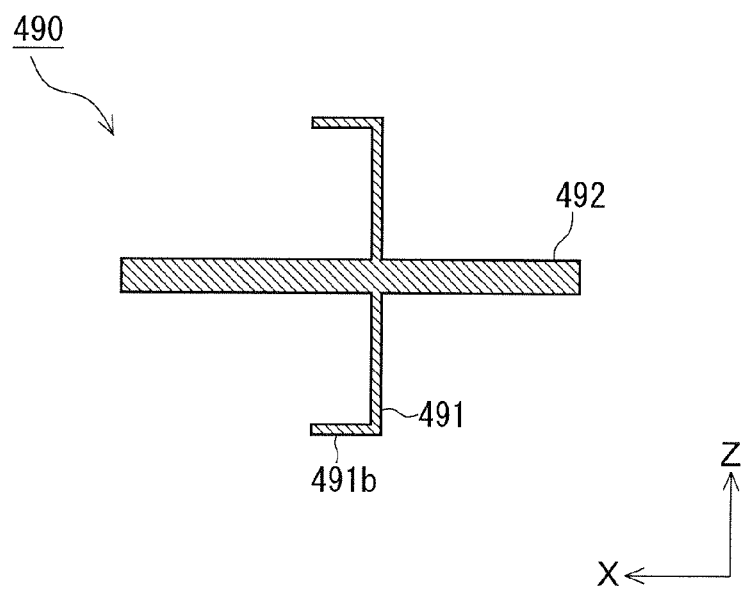
FIG. 19B is a sectional view along line F-F of FIG. 19A.

FIG. 19A is a front view showing another electrode terminal of the lithium-ion rechargeable battery according to the present invention, and FIG. 19B is a sectional view along line F-F of FIG. 19A.

As shown in FIGS. 19A and 19B, the electrode terminal 490 has a metal base part 491 and a metal terminal part 492 that is integrally molded so as to protrude at the front and back of the base part 491. Consequently, conduction occurs between the base part 491 and the terminal part 492. This electrode terminal 490 can be used instead of the electrode terminals of the first through third embodiments by using an appropriate laminate material for the exterior canister and the sealing plate.

For example, in a case in which the electrode terminal 490 is connected to the exterior canister 70 of the first embodiment, the base part 491 has an elliptical shape somewhat larger than the through-holes 76 of the exterior canister 70, and the peripheral edge thereof is folded outward to a degree that allows crimp joining with the through-hole folded part 76*a*, and a base folded part 491*b* is thus formed.

As shown in FIG. 15A, after the base folded part 491*b* is placed so as to cover the through-hole folded part 76*a*, crimping is performed and the electrode terminal 490 is fixed from the inside of the exterior canister 70 by crimp-joining (preferably, folded crimp-joining) in the manner shown in FIG. 15B. Greater airtightness can be achieved by applying a sealing material (not shown) to the pressure-welded portions.

The electrode terminal 490 is an integrally molded metal article and can therefore be manufactured at lower cost than the electrode terminals 90 of the first embodiment. Cost can therefore be reduced when the electrode terminal 490 is used in cases in which conduction between the base part and the terminal part is permissible.

Another Embodiment of the Electrode Terminal

Figure 20A:
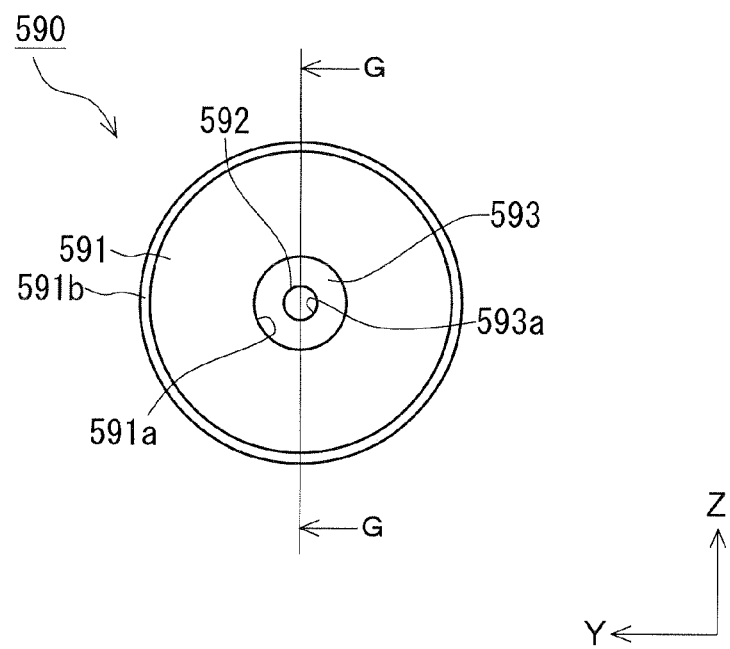
FIG. 20A is a front view showing another electrode terminal of the lithium-ion rechargeable battery according to the present invention.
Figure 20B:
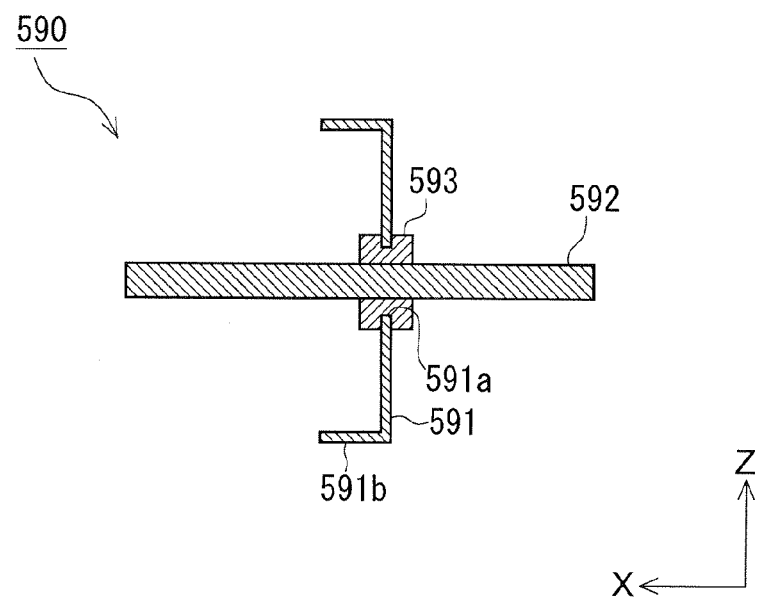
FIG. 20B is a sectional view along line G-G of FIG. 20A.

FIG. 20A is a front view showing yet another electrode terminal of the lithium-ion rechargeable battery of the present invention, and FIG. 20B is a sectional view along line G-G of FIG. 20A.

The electrode terminal 590, as shown in FIGS. 20A and 20B, includes: a metal base part 591 having a through-hole 591*a*; a metal terminal part 592 passed through the through-hole 591*a*; and an insulation part 593 for insulating the terminal part 592 and the base part 591. The electrode terminal 590 can be used instead of the electrode terminal of the first to third embodiments.

In a case where the electrode terminal 590 is connected to the exterior canister, the base part 591 has a round shape somewhat larger than the through-holes of the exterior canister, and the peripheral edge thereof is folded outward to a degree that allows crimp-joining with the through-hole folded part of the exterior canister, and a base folded part 591*b* is thus formed.

The terminal part 592 is a cylindrically shaped metal terminal sized so as not to touch the through-hole 591*a*. The insulation part 593 is a donut-shaped insulating material having a through-hole 593*a*, and rubber or another insulative resin can be used therefor. A groove is formed in the outer periphery of the insulation part 593, and the groove is fitted into the through-hole 591*a* of the base part 591. The terminal part 592 is inserted tightly into the through-hole 593*a*.

In accordance with FIG. 15A, after the base folded part 591*b* is placed so as to cover the through-hole folded part of the exterior canister, crimping is performed and the electrode terminal 590 is fixed from the inside of the exterior canister by crimp-joining (preferably, folded crimp-joined) in a manner in accordance with FIG. 15B. Greater air-tightness can be achieved by applying a sealing material (not shown) to the pressure-welded portion.

It is thus easier to crimp at the electrode terminal 590 due to the base part 591 being given a round shape. The electrode terminal 590 may also be integrally molded of metal such that there is conduction between the base part and the electrode part, as in the electrode terminal 490 shown in FIGS. 19A and 19B.

(Another Mode for Attaching the Electrode Terminal Prior to Crimp-Joining)

Figure 21:
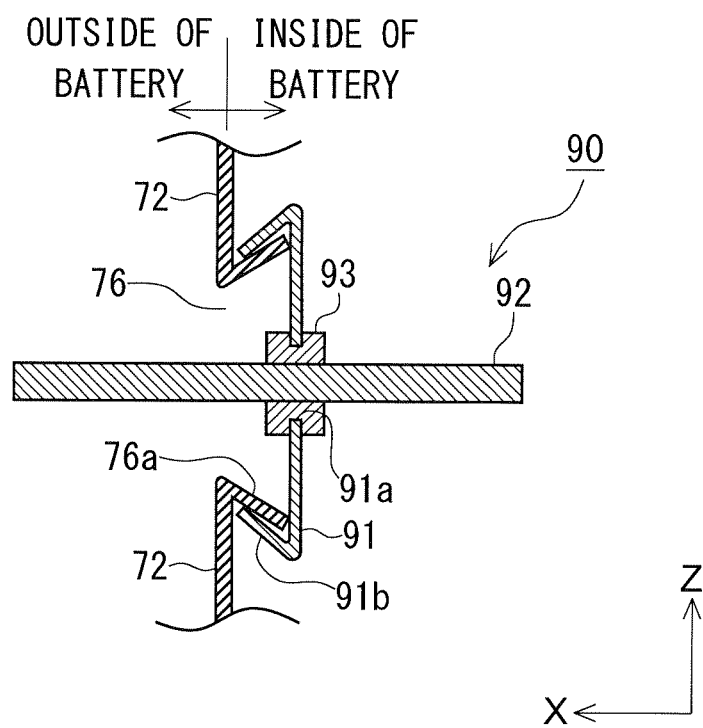
FIG. 21 is a sectional view showing the relevant parts of the lithium-ion rechargeable battery of the present invention in a state in which the electrode terminal prior to crimp joining is attached to the exterior container.

FIG. 21 is a sectional view of the state in which the electrode terminal prior to crimp-joining is attached to the exterior container. FIG. 21 switches the bent angles of the base folded part 91*b* of the electrode terminal 90 and the through-hole folded part 76*a* of the exterior canister 70 in FIG. 15A.

Tightening the bent angles of the base folded part 91*b* of the electrode terminal 90 and the through-hole folded part 76*a* of the exterior canister 70 to be tighter than the state in FIG. 15, i.e., to be less than 90°, prevents the electrode terminal 90 from falling out between being attached to and crimped to the exterior canister 70 and facilitates operation. There is also less crimping, and crimping is therefore easier. FIG. 21, although illustrating the first embodiment by way of example, can be similarly applied to the second and third embodiments.

The presently disclosed embodiment is in all regards an illustrative example and should not be considered to be in any way limiting. The scope of the present invention is indicated by what is claimed and not by the above description of the embodiments, and further includes all modifications made in the same scope and spirit as what is claimed.

For example, although each of the embodiments described above illustrate examples where the present invention is applied to a laminate-type lithium ion rechargeable battery, the present invention is not limited thereto; for example, the present invention may also be applied to a coiled-type lithium ion rechargeable battery.

Further, although each of the embodiments described above illustrate examples where the present invention is applied to a lithium ion rechargeable battery, which is one example of a rechargeable battery (a non-aqueous electrolyte rechargeable battery), the present invention is not limited thereto; for example, the present invention may also be applied to a non-aqueous electrolyte rechargeable battery other than a lithium ion rechargeable battery. The present invention may also be applied to a rechargeable battery other than a non-aqueous electrolyte rechargeable battery. The present invention can also be applied in an as-yet undisclosed rechargeable battery.

Also, although each of the embodiments described above illustrate examples where active material layers are formed on both surfaces of the electrode collector, the present invention is not limited thereto, and an active material layer may also be formed only on one surface of the electrode collector. The configuration may also be such that a part of the electrode group includes electrodes (positive electrodes or negative electrodes) having an active material layer formed only on one surface of the electrode collector. A swellable resin that swells in a non-aqueous electrolyte solution may also be dispersed in the active material layer of the electrodes. Examples of swellable resins that can be used as the constituting resin include at least one type selected from the group consisting of nitrile butadiene rubber (NBR), styrene-butadiene rubber (SBR), carboxymethyl cellulose (CMC), polyvinylidene fluoride (PVdF), polyvinyl alcohol (PVA), polyethylene oxide (PEO), propylene oxide, polystyrene, and polymethyl methacrylate.

Although each of the embodiments described above illustrate examples where a non-aqueous electrolyte solution is used as the electrolyte of the rechargeable battery, the present invention is not limited thereto, and an electrolyte other than a non-aqueous electrolyte solution, e.g., a gelled electrolyte, a solid polymer electrolyte, a solid inorganic electrolyte, a molten salt electrolyte, or the like may also be used as the electrolyte.

Further, although each of the embodiments described above illustrate examples where the opening of the exterior canister is double-seam sealed by the sealing plate, the present invention is not limited thereto, and the method for sealing the exterior canister may also be a method other than double-seam sealing. For example, the exterior canister may also be sealed by the sealing plate being welded to the exterior canister.

Also, although each of the embodiments described above illustrate examples configured such that the negative electrode (negative electrode active material layer) is larger than the positive electrode (positive electrode active material layer), the present invention is not limited thereto, and the configuration may also be such that the positive electrode (positive electrode active material layer) and the negative electrode (negative electrode active material layer) are given the same size, or the configuration may be such that the positive electrode (positive electrode active material layer) is larger than the negative electrode (negative electrode active material layer).

Although each of the embodiments described above illustrate examples where the electrode collector exposure part is formed on one end of the electrode collector, the present invention is not limited thereto, and the electrode collector exposure part may also be formed at, for example, both ends of the electrode collector.

The following provides examples corresponding to each of the embodiments. The first to thirteenth examples correspond to the first embodiment. The fourteenth to eighteenth examples correspond to the second embodiment, and the nineteenth and twentieth examples correspond to the third embodiment.

First Example

In a lithium ion rechargeable battery of the first example, which corresponds to the first embodiment. The external canister, the sealing plate, and the integrally molded metal terminal, being the electrode terminal of the negative electrode and the positive electrode illustrated in FIGS. 19A and 19B (where the positive electrode is aluminum and the negative electrode is copper), are a double-sided laminated material in which both sides of SUS (0.8 mm thick) are laminated with PE (0.02 mm thick). The configuration otherwise emulates the first above-described example of the first embodiment. The external canister and the sealing body are accordingly insulated.

Second Example

In a lithium ion rechargeable battery of the second example, which corresponds to the first embodiment. The external canister; the sealing plate; the integrally molded metal terminal, being the electrode terminal of the negative electrode composed of copper illustrated in FIGS. 19A and 19B; and the insulative terminal, being the electrode terminal of the positive electrode illustrated in FIGS. 14A and 14B; are SUS (0.8 mm thick). The configuration otherwise emulates the first above-described example of the first embodiment. There is accordingly conduction between the external canister and the sealing body.

Third Example

In a lithium ion rechargeable battery of the third example, which corresponds to the first embodiment. The external canister, the sealing plate, and the insulative terminal, being the electrode terminal of the negative electrode and the positive electrode illustrated in FIGS. 14A and 14B, are SUS (0.8 mm thick). The configuration otherwise emulates the first above-described example of the first embodiment. There is accordingly conduction between the external canister and the sealing body.

Fourth Example

In a lithium ion rechargeable battery of the fourth example, which corresponds to the first embodiment. The external canister; the insulative terminal, being the electrode terminal of the negative electrode illustrated in FIGS. 14A and 14B; and the integrally molded metal terminal, being the electrode terminal of the positive electrode composed of aluminum illustrated in FIGS. 19A and 19B; are aluminum (0.6 mm thick), and the sealing plate is Fe—Al (0.6 mm thick). The configuration otherwise emulates the first above-described example of the first embodiment. There is accordingly conduction between the external canister and the sealing body.

Fifth Example

In a lithium ion rechargeable battery of the fifth example, which corresponds to the first embodiment. The external canister, and the insulative terminal, being the electrode terminal of the negative electrode and the positive electrode illustrated in FIGS. 14A and 14B, are aluminum (1 mm thick), and the sealing plate is Fe—Al (1 mm thick). The configuration otherwise emulates the first above-described example of the first embodiment. There is accordingly conduction between the external canister and the sealing body.

Sixth Example

In a lithium ion rechargeable battery of the sixth example, which corresponds to the first embodiment. The external canister, and the insulative terminal, being the electrode terminal of the negative electrode and the positive electrode illustrated in FIGS. 14A and 14B, are SUS (0.8 mm thick), and the sealing plate is Fe—Ni (0.8 mm thick). The configuration otherwise emulates the first above-described example of the first embodiment. There is accordingly conduction between the external canister and the sealing body.

Seventh Example

In a lithium ion rechargeable battery of the seventh example, which corresponds to the first embodiment. The external canister, and the insulative terminal, being the electrode terminal of the negative electrode and the positive electrode illustrated in FIGS. 14A and 14B, are Fe—Al (1 mm thick), and the sealing plate is aluminum (1 mm thick). The configuration otherwise emulates the first above-described example of the first embodiment. There is accordingly conduction between the external canister and the sealing body.

Eighth Example

In a lithium ion rechargeable battery of the eighth example, which corresponds to the first embodiment. The external canister, and the insulative terminal, being the electrode terminal of the negative electrode and the positive electrode illustrated in FIGS. 14A and 14B, are aluminum (1 mm thick), and the sealing plate is a single-sided laminated material in which the inner side of the battery made of aluminum (1 mm thick) is laminated with PE (0.02 mm thick). The configuration otherwise emulates the first above-described example of the first embodiment. There is accordingly conduction between the external canister and the sealing body.

Ninth Example

In a lithium ion rechargeable battery of the ninth example, which corresponds to the first embodiment. The external canister, and the insulative terminal, being the electrode terminal of the negative electrode and the positive electrode illustrated in FIGS. 14A and 14B, are a double-sided laminated material in which two sides of iron (0.8 mm thick) are laminated with PE (0.03 mm thick), and the sealing plate is aluminum (0.8 mm thick). The configuration otherwise emulates the first above-described example of the first embodiment. The external canister and the sealing body are accordingly insulated.

Tenth Example

In a lithium ion rechargeable battery of the tenth example, which corresponds to the first embodiment. The external canister, and the insulative terminal, being the electrode terminal of the negative electrode and the positive electrode illustrated in FIGS. 14A and 14B, are a single-sided laminated material in which the inner side of the battery made of iron (0.8 mm thick) is laminated with PE (0.05 mm thick), and the sealing plate is a double-sided laminated material in which two sides of iron (0.8 mm thick) are laminated with PE (0.05 mm thick). The configuration otherwise emulates the first above-described example of the first embodiment. The external canister and the sealing body are accordingly insulated.

Eleventh Example

In a lithium ion rechargeable battery of the eleventh example, which corresponds to the first embodiment. The external canister, the sealing plate, and the insulative terminal, being the electrode terminal of the negative electrode and the positive electrode illustrated in FIGS. 14A and 14B, are a single-sided laminated material in which the inner side of the battery made of Fe—Ni (0.6 mm thick) is laminated with PE (0.02 mm thick). The configuration otherwise emulates the first above-described example of the first embodiment. There is accordingly conduction between the external canister and the sealing body.

Twelfth Example

In a lithium ion rechargeable battery of the twelfth example, which corresponds to the first embodiment. The external canister, the sealing plate, and the insulative terminal, being the electrode terminal of the negative electrode and the positive electrode illustrated in FIGS. 14A and 14B, are a single-sided laminated material in which the inner side of the battery made of iron (0.8 mm thick) is laminated with PE (0.02 mm thick). The configuration otherwise emulates the first above-described example of the first embodiment. There is accordingly conduction between the external canister and the sealing body.

Thirteenth Example

In a lithium ion rechargeable battery of the thirteenth example, which corresponds to the first embodiment. The external canister, and the insulative terminal, being the electrode terminal of the negative electrode and the positive electrode illustrated in FIGS. 14A and 14B, are a doubled-sided laminated material in which two sides of aluminum (1 mm thick) are laminated with PE (0.05 mm thick), and the sealing plate is Fe—Al (1 mm thick). The configuration otherwise emulates the first above-described example of the first embodiment. There is accordingly conduction between the external canister and the sealing body.

Fourteenth Example

In a lithium ion rechargeable battery of the fourteenth example, which corresponds to the second embodiment. The external canister, the sealing plate, and the insulative terminal, being the electrode terminal of the negative electrode and the positive electrode illustrated in FIGS. 17A and 17B, are Fe—Ni (0.8 mm thick). The configuration otherwise emulates the first above-described example of the first embodiment, except in that the exposure parts of the positive electrode and the negative electrode are arranged on the same side as the terminal part within the electrode group. There is accordingly conduction between the external canister and the sealing body.

Fifteenth Example

In a lithium ion rechargeable battery of the fifteenth example, which corresponds to the second embodiment. The external canister, the sealing plate, and the insulative terminal, being the electrode terminal of the negative electrode and the positive electrode illustrated in FIGS. 17A and 17B, are Fe—Al (0.8 mm thick). The configuration otherwise emulates the first above-described example of the first embodiment, except in that the exposure parts of the positive electrode and the negative electrode are arranged on the same side as the terminal part within the electrode group. There is accordingly conduction between the external canister and the sealing body.

Sixteenth Example

In a lithium ion rechargeable battery of the sixteenth example, which corresponds to the second embodiment. The external canister, the sealing plate, and the insulative terminal, being the electrode terminal of the negative electrode and the positive electrode illustrated in FIGS. 17A and 17B, are a double-sided laminated material in which two sides of iron (0.8 mm thick) are laminated with PE (0.02 mm thick). The configuration otherwise emulates the first above-described example of the first embodiment, except in that the exposure parts of the positive electrode and the negative electrode are arranged on the same side as the terminal part within the electrode group. The external canister and the sealing body are accordingly insulated.

Seventeenth Example

In a lithium ion rechargeable battery of the seventeenth example, which corresponds to the second embodiment. The external canister, and the insulative terminal, being the electrode terminal of the negative electrode and the positive electrode illustrated in FIGS. 17A and 17B, are Fe—Ni (1 mm thick), and the sealing plate is aluminum (1 mm thick). The configuration otherwise emulates the first above-described example of the first embodiment, except in that the exposure parts of the positive electrode and the negative electrode are arranged on the same side as the terminal part within the electrode group. There is accordingly conduction between the external canister and the sealing body.

Eighteenth Example

In a lithium ion rechargeable battery of the eighteenth example, which corresponds to the second embodiment. The external canister, the sealing plate, and the insulative terminal, being the electrode terminal of the negative electrode and the positive electrode illustrated in FIGS. 17A and 17B, are aluminum (1 mm thick). The configuration otherwise emulates the first above-described example of the first embodiment, except in that the exposure parts of the positive electrode and the negative electrode are arranged on the same side as the terminal part within the electrode group. There is accordingly conduction between the external canister and the sealing body.

Nineteenth Example

In a lithium ion rechargeable battery of the nineteenth example, which corresponds to the third embodiment. The external canister, the sealing plate, and the insulative terminal, being the electrode terminal of the negative electrode and the positive electrode illustrated in FIGS. 14A and 14B, are Fe—Ni (1 mm thick). The configuration otherwise emulates the first above-described example of the first embodiment. There is accordingly conduction between the external canister and the sealing body.

Twentieth Example

In a lithium ion rechargeable battery of the twentieth example, which corresponds to the third embodiment. The external canister, the sealing plate, and the insulative terminal, being the electrode terminal of the negative electrode and the positive electrode illustrated in FIGS. 14A and 14B, are a double-sided laminated material in which two sides of aluminum (0.8 mm thick) are laminated with PE (0.02 mm thick). The configuration otherwise emulates the first above-described example of the first embodiment. The external canister and the sealing body are accordingly insulated.

Results from Evaluating the First to Twentieth Examples

The lithium ion rechargeable batteries of the first to twentieth examples were prepared and evaluated as follows. After charging at a constant current and constant voltage for five hours with a charging voltage of 3.5 V, a low-current electrical discharge to 2.5 V was thereafter performed, and the battery capacity (the initial battery capacity) was measured. Cycle testing was also performed in the above-described electrical charging and discharging conditions, in an environment having an ambient air temperature of 45° C. The results in all examples gave a capacity retention rate of 93% or higher relative to the initial electrical discharge capacity, even after 200 cycles were performed. Also, there was no leakage of fluid from the electrode terminal or elsewhere.

Next, various different forms of the lithium ion rechargeable battery of the third example were performed, with changes to the degree of overlap (ratio of overlap) in the crimp-joining between the exterior canister and the electrode terminal, and the airtightnesses thereof were evaluated. In the evaluation, a hole was opened on the bottom of the external canister and structure so as to permit the application of pressure to the inside of the battery, and no electrolyte solution was placed therein. The batteries were held in water and pressure was gradually applied to the inside of the exterior canister; airtightness was evaluated through an examination of foam leakage. In the results, in those lithium ion rechargeable batteries having a ratio of overlap of 50% or higher, no foam from the crimp joined part between the exterior canister and the electrode terminal was observed, and airtightness was maintained, even when the pressure inside the exterior canister was greater than 1 MPa.

Based on the above, the lithium ion rechargeable batteries of the first to twentieth examples can be considered to have fulfilled the certain properties required for rechargeable batteries.

What is claimed is:

1. A rechargeable battery comprising:
an electrode group including a positive electrode and a negative electrode;
an exterior container including a housing container for housing said electrode group; and a sealing body for sealing an open part of the housing container;
a pair of electrode terminals crimp-joined to said exterior container from inside said exterior container; and
an electrolyte solution filled into said exterior container, wherein
said housing container has a side wall part having a first through-hole in which said pair of electrode terminals are inserted,
said first through-hole has, around a peripheral edge thereof, a first folded part which is folded to inside of said housing container,
said electrode terminals have a second folded part which is folded from inside to outside of said housing container, and
said electrode terminals are crimp-joined to said housing container such that said second folded part covers said first folded part.

2. The rechargeable battery according to claim 1, wherein said pair of electrode terminals is provided to the same side wall part of said housing container.

3. The rechargeable battery according to claim 1, wherein at least one of said pair of electrode terminals has a metal base part having a second through-hole, said metal base part having said second folded part around a peripheral edge thereof; a metal terminal part passed through said second through-hole; and an insulation part for insulating said terminal part and said base part; and
said base part is crimp joined to said exterior container.

4. The rechargeable battery according to claim 1, wherein at least one of said pair of electrode terminals has a metal base part which has said second folded part around a peripheral edge thereof, and a metal terminal part integrally molded so as to protrude at a front and back of the base part; and
said base part is crimp joined to said exterior container.

5. The rechargeable battery according to claim 1, wherein
said housing container comprises a double-sided laminate material formed by laminating both sides of a metal sheet with an insulative resin; and
said pair of electrode terminals has a metal base part which has said second folded part around a peripheral edge thereof, a metal terminal part integrally molded so as to protrude at a front and back of the base part, and said base part is crimp joined to said exterior container.

6. A rechargeable batter comprising:
an electrode group including a positive electrode and a negative electrode;
an exterior container including a housing container for housing said electrode group and a sealing body for sealing an open part of the housing container;
a pair of electrode terminals crimp-joined to said exterior container from inside said exterior container; and
an electrolyte solution filled into said exterior container, wherein
said pair of electrode terminals is provided to said housing container of said exterior container,
said housing container comprises a single-sided laminate material formed by laminating one side of a metal sheet with an insulative resin;
one of said electrode terminals has a metal first base part having a through-hole, a metal first terminal part passed through said through-hole, and an insulation part for insulating said first terminal part and said first base part, and said first base part is crimp-joined; and
the other of said electrode terminals has a metal second base part, and a metal second terminal part integrally molded so as to protrude at a front and back of the second base part, and said second base part is crimp joined to said exterior container.

7. The rechargeable battery according to claim 5, wherein the thickness of said metal sheet is 0.5 mm to 2 mm.

8. The rechargeable battery according to claim 6, wherein the thickness of said metal sheet is 0.5 mm to 2 mm.

9. The rechargeable battery according to claim 1, wherein
said housing container comprises a metal sheet; and
said pair of electrode terminals has a metal base part having a second through-hole, said metal base part having said second folded part around a peripheral edge thereof; a metal terminal part passed through said through-hole; and an insulation part for insulating said terminal part and said base part; and said base part is crimp joined to said exterior container.

10. The rechargeable battery according to claim 1, wherein said crimp is a folded crimp.

11. The rechargeable battery according to claim 10, wherein the overlap during formation of said folded crimp is 50% or greater.

12. The rechargeable battery according to claim 1, wherein said housing container and said sealing body are double-seam sealed.

13. The rechargeable battery according to claim 12, wherein the overlap during said double-seam sealing is 70% or greater.

* * * * *